United States Patent
Kucherov et al.

(10) Patent No.: US 10,705,753 B2
(45) Date of Patent: Jul. 7, 2020

(54) FAN-OUT ASYNCHRONOUS REPLICATION LOGICAL LEVEL CACHING

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/971,310

(22) Filed: May 4, 2018

(65) Prior Publication Data
US 2019/0339871 A1 Nov. 7, 2019

(51) Int. Cl.
*G06F 3/06* (2006.01)
*G06F 11/20* (2006.01)
(Continued)

(52) U.S. Cl.
CPC ............ *G06F 3/065* (2013.01); *G06F 3/0619* (2013.01); *G06F 3/0631* (2013.01); *G06F 3/0641* (2013.01); *G06F 3/0689* (2013.01); *G06F 11/108* (2013.01); *G06F 11/1092* (2013.01); *G06F 11/2094* (2013.01); *G06F 16/137* (2019.01); *G06F 16/27* (2019.01); *G06F 2201/84* (2013.01)

(58) Field of Classification Search
CPC ........ G06F 3/065; G06F 16/27; G06F 16/273; G06F 16/275; G06F 16/278; G06F 16/137; G06F 3/0619; G06F 3/0631; G06F 3/0641; G06F 3/0689; G06F 11/108; G06F 11/1092; G06F 11/2094; G06F 2201/84; G06F 3/0608; G06F 3/067

See application file for complete search history.

(56) References Cited

U.S. PATENT DOCUMENTS 6,453,319 B1 * 9/2002 Mattis ................ H04L 67/2842
6,496,908 B1 12/2002 Kamvysselis et al.
(Continued)

OTHER PUBLICATIONS

U.S. Appl. No. 16/050,247, filed Jul. 31, 2018, Schneider et al.
(Continued)

*Primary Examiner* — Charles Rones
*Assistant Examiner* — Tony B. Vo
(74) *Attorney, Agent, or Firm* — Daly Crowley Mofford & Durkee, LLP

(57) ABSTRACT

A response is provided to a request to replicate a long hash from a production system to a plurality of target systems. Replication of the long hash to each target systems is associated with a corresponding replication session. The production system comprises a processor and a memory storing a plurality of long hashes, each long hash computed based on a data packet. A replication session is established for each target system. The long hash is retrieved for one of the replication sessions and stored in a logical cache configured as part of a logical layer of a computer system and to allow other replication sessions to access the long hash stored therein. Dynamic tracking of when each of the replication sessions accesses the long hash stored in the logical cache, takes place. The long hash is cleared from the logical cache when all replication sessions have accessed it.

20 Claims, 13 Drawing Sheets

(51) Int. Cl.
*G06F 11/10* (2006.01)
*G06F 16/27* (2019.01)
*G06F 16/13* (2019.01)

(56) References Cited

U.S. PATENT DOCUMENTS

| | | |
|---|---|---|
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Mamhak et al. |
| 6,938,122 B1 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Mamhak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longmov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 * | 11/2009 | Meiri .............. G06F 11/2064 711/112 |
| 7,617,372 B1 | 11/2009 | Bjornsson et al. |
| 7,702,871 B1 | 4/2010 | Arnon et al. |
| 7,765,187 B2 | 7/2010 | Bergant et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,756,329 B2 | 6/2014 | Reynolds et al. |
| 8,782,357 B2 | 7/2014 | Halstead et al. |
| 8,799,601 B1 | 8/2014 | Chen et al. |
| 8,812,595 B2 | 8/2014 | Meiri et al. |
| 8,825,964 B1 | 9/2014 | Soplca et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 8,990,495 B2 | 3/2015 | Hallak et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,063,910 B1 | 6/2015 | Kallak et al. |
| 9,100,343 B1 | 8/2015 | Riordan et al. |
| 9,104,326 B2 | 8/2015 | Frank et al. |
| 9,110,693 B1 | 8/2015 | Meiri et al. |
| 9,141,290 B2 | 9/2015 | Hallak et al. |
| 9,208,162 B1 | 12/2015 | Hallak et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,384,206 B1 | 7/2016 | Bono et al. |
| 9,396,243 B1 * | 7/2016 | Halevi .............. G06F 16/27 |
| 9,418,131 B1 | 8/2016 | Halevi et al. |
| 9,442,941 B1 | 9/2016 | Luz et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,658,983 B1 * | 5/2017 | Barber .............. G06F 16/219 |
| 9,727,273 B1 * | 8/2017 | Dantkale .............. G06F 3/0641 |
| 9,753,663 B1 | 9/2017 | LeCrone et al. |
| 9,921,963 B1 | 3/2018 | Li et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 10,238,487 B2 | 3/2019 | Alon et al. |
| 10,261,853 B1 | 4/2019 | Chen et al. |
| 10,310,951 B1 | 6/2019 | Chen et al. |
| 10,324,635 B1 | 6/2019 | Meiri |
| 10,324,640 B1 | 6/2019 | Chen et al. |
| 10,324,806 B1 | 6/2019 | Kucherov et al. |
| 10,331,350 B1 | 6/2019 | Kucherov et al. |
| 10,338,851 B1 | 7/2019 | Kronrod et al. |
| 10,359,965 B1 | 7/2019 | Stronge et al. |
| 10,374,792 B1 | 8/2019 | Meiri et al. |
| 10,394,485 B1 | 8/2019 | Chen et al. |
| 10,409,520 B1 | 9/2019 | Meiri et al. |
| 10,437,855 B1 | 10/2019 | Stronge et al. |
| 10,459,632 B1 | 10/2019 | Chen et al. |
| 10,459,883 B1 | 10/2019 | Meiri et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,503,609 B1 | 12/2019 | Stronge et al. |
| 10,534,547 B2 | 1/2020 | Meiri et al. |
| 10,565,058 B1 | 2/2020 | Meiri et al. |
| 2012/0260021 A1 | 10/2012 | Rudelic |
| 2014/0281110 A1 * | 9/2014 | Duluk, Jr. .............. G06F 13/404 710/313 |
| 2015/0019812 A1 | 1/2015 | Ban |

OTHER PUBLICATIONS

U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 15/001,789, filed Jan. 20, 2016, Meiri et al.
U.S. Appl. No. 15/076,775, filed Mar. 22, 2016, Chen et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,297, filed Apr. 27, 2017, Kucherov et al.
U.S. Appl. No. 15/499,303, filed Apr. 27, 2017, Kucherov et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,325, filed May 4, 2018, Kucherov et al.
U.S. Appl. No. 15/971,445, filed May 4, 2018, Kucherov et al.
U.S. Notice of Allowance dated Apr. 17, 2019 for U.S. Appl. No. 15/970,243; 10 Pages.
U.S. Appl. No. 15/970,243, filed May 3, 2018, 18 Pages.

(56) References Cited

OTHER PUBLICATIONS

U.S. Appl. No. 15/971,325, filed May 4, 2018, 46 Pages.
U.S. Appl. No. 15/971,153, filed May 4, 2018, 20 Pages.
Preliminary Amendment filed Aug. 27, 2019 for U.S. Appl. No. 15/971,325; 8 Pages.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.
U.S. Appl. No. 16/521,728, filed Jul. 25, 2019, Meiri et al.
U.S. Appl. No. 16/521,730, filed Jul. 25, 2019, Meiri et al.
U.S. Appl. No. 16/516,670, filed Jul. 19, 2019, Kucherov et al.
U.S. Appl. No. 16/516,677, filed Jul. 19, 2019, Meiri et al.
U.S. Appl. No. 16/747,169, filed Jan. 20, 2020, Chen et al.
U.S. Non-Final Office Action dated Apr. 2, 2020 for U.S. Appl. No. 15/971,325; 12 Pages.

* cited by examiner

| | Short hash 802 | Long hash 804 | Logical Cache Counter (LC_cntr) of sessions that have not yet accessed this hash handle 808 |

| Collision? | Short hash 802 | Corresponding long hash 804 | LC_cntr for respective short hash 808 |
|---|---|---|---|
| Yes | 234 | 1634 | 4 |
| Yes | 567 | 4567 | 1 |
| Yes | 890 | 7890 | 3 |
| Yes | 345 | 2345 | 2 |
| Yes | 456 | 3456 | 0 | } Can be removed

| Collision? | Short hash 802 | Corresponding long hash 804 | LC_cntr for respective short hash 808 |
|---|---|---|---|
| Yes | 234 | 1634 | 4 |
| Yes | 567 | 4567 | 1 |
| No | 890 | Not needed | 3 |
| No | 345 | Not needed | 2 |
| No | 456 | 3456 | 0 |

Entry associated with LC_cntr = 0 can be removed

FIG. 8C

| Location | Short hash 802 | Corresponding long hash 804 | LC_cntr for respective short hash 808 |
|---|---|---|---|
| 0100 | 234 | 1634 | 4 |
| 0200 | 567 | 4567 | 1 |
| 0300 | 234 | Copy from long hash at location 0100 | 3 |
| 0400 | 345 | 2345 | 2 |
| 0500 | 456 | 3456 | 0 |

| Access type 1052 | Hash handle 1054 | LRU exempt 1056 | Page data/data block 1058 | Physical Cache Counter (PC_cntr) of replication accesses remaining 1060 |
|---|---|---|---|---|

| Time | Access type 1052 | Hash handle 1054 F bit =1st | LRU exempt 1056 | Page data/data block 1058 | Physical Cache Counter (PC_cntr) of replication accesses remaining 1060 |
|---|---|---|---|---|---|
| $T_0$ | Replication | 234F | True | 99887766554433 | 4 |
| $T_1$ | Replication | 234 | True | 99887766554433 | 3 |
| $T_2$ | Non-Replication | 234 | False | 99887766554433 | 3 |
| $T_3$ | Replication | 234 | True | 99887766554433 | 2 |
| $T_4$ | Replication | 567F | True | 11223344556677 | 4 |
| $T_5$ | Replication | 234 | True | 99887766554433 | 1 |
| $T_6$ | Replication | 567 | True | 11223344556677 | 3 |
| $T_7$ | Replication | 234 | True | 99887766554433 | 0 |
| $T_8$ | Non-Replication | 567 | False | 11223344556677 | 3 |
| $T_9$ | Replication | 890F | True | 11992288337744 | 4 |

Can be removed; LRU exempt will change to False after access complete

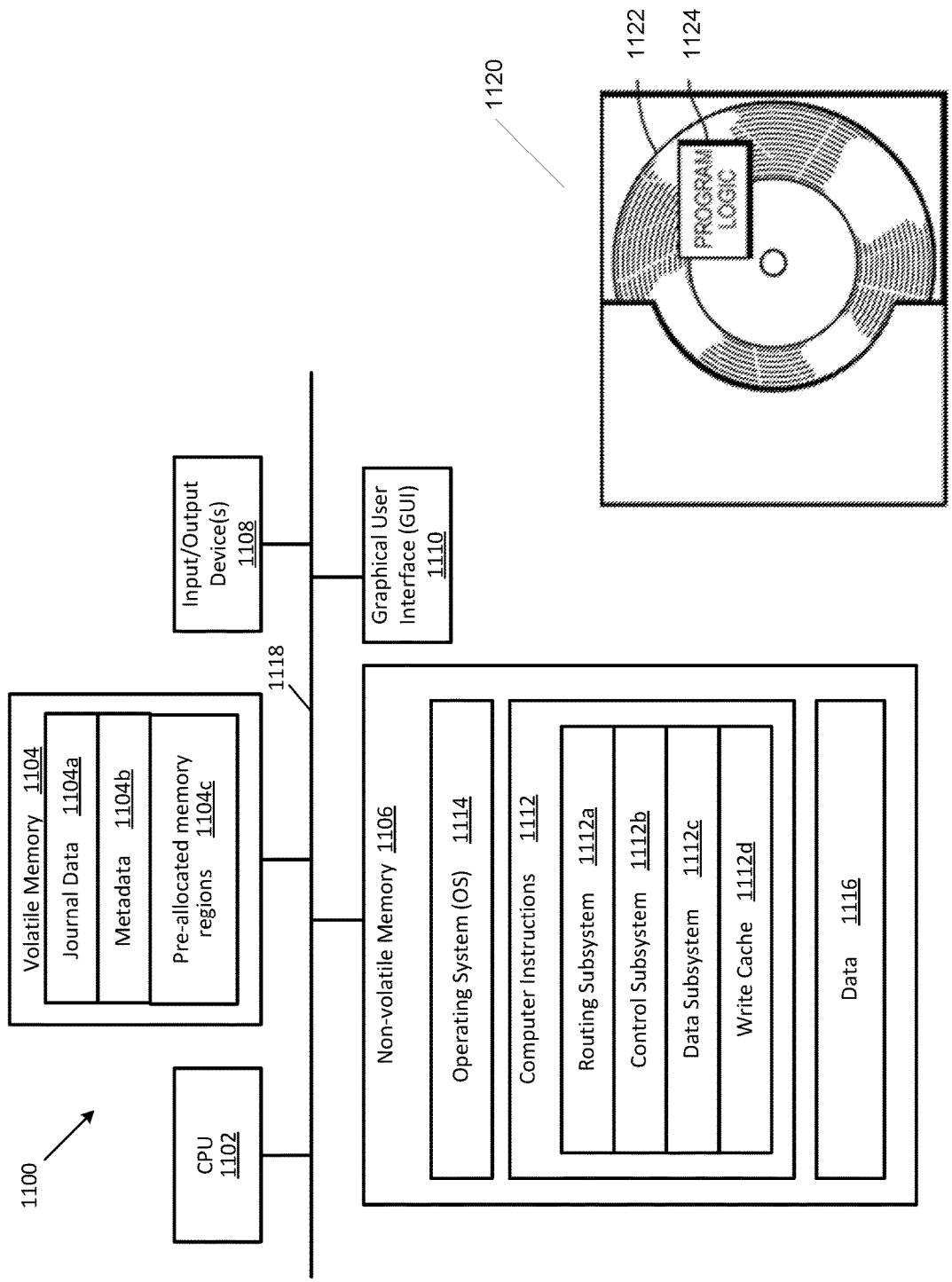

FAN-OUT ASYNCHRONOUS REPLICATION LOGICAL LEVEL CACHING

FIELD

This application relates at least generally to devices, systems, and methods for data storage and data processing in computer systems. More particularly, this application relates at least to ways to improve efficiency of asynchronous replication.

BACKGROUND

Computer data is vital to today's organizations, and content addressable storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization. Logical volume metadata used with these systems can provide flexible mapping from logical address to data content references, also known as a hash handle. The logical volume metadata also can make snapshot and single instance storage operations highly efficient.

In network environments where high-availability is a necessity, system administrators are constantly faced with the challenges of preserving data integrity and ensuring availability of critical system components, such as data systems and file systems. A significant part of protection of computer data against disasters is focused on data protection and on providing ways for computer systems to recover from disasters and other disruptions. Storage systems sometimes experience failures. For example, a storage device, such as a disk drive, may malfunction making the data stored therein inaccessible (at least temporarily). In addition, data and/or metadata stored on a storage system, or used by a storage system, may become corrupted. To protect against data loss as result of data and/or metadata corruption, file system corruption, and/or hardware failure, storage systems frequently use one or more protection strategies, such as mirroring and use of RAID (Redundant Array of Independent Disks), by taking systems offline to run diagnostic tools, perform manual corrections, etc.

SUMMARY

This Summary is provided to introduce a selection of concepts in a simplified form, to provide a basic understanding of one or more embodiments that are further described below in the Detailed Description. This Summary is not intended to identify key features or essential features of the claimed subject matter, nor is it intended to be used to limit the scope of the claimed subject matter.

In certain embodiments, a computer-implemented method is provided. A response is provided to a request to replicate a long hash from a production system to a plurality of target systems, wherein replication of the long hash to the plurality of target systems is associated with a corresponding replication session to each of the plurality of respective target systems, wherein the production system comprises a processor and a memory, the memory storing a plurality of long hashes, each respective long hash computed based on a corresponding data packet. A corresponding replication session is established for each of the plurality of target systems. The long hash is retrieved for one of the corresponding replication sessions and stored in a logical cache configured as part of a logical layer of a computer system, wherein the logical cache is configured to allow replication sessions to access the long hash stored therein. Dynamic tracking of when each of the corresponding replication sessions accesses the long hash stored in the logical cache, takes place. The long hash is cleared from the logical cache when all of the corresponding replication sessions have accessed the stored long hash.

In certain embodiments, a system is provided, comprising a processor and a non-volatile memory in operable communication with the processor and storing computer program code that when executed on the processor causes the processor to execute a process operable to perform operations. The operations include responding to a request to replicate a long hash from a production system to a plurality of target systems, wherein replication of the long hash to the plurality of target systems is associated with a corresponding replication session to each of the plurality of respective target systems, wherein the production system comprises a processor and a memory, the memory storing a plurality of long hashes, each respective long hash computed based on a corresponding data packet. The operations include establishing a corresponding replication session for each of the plurality of target systems, retrieving the long hash for one of the corresponding replication sessions, and storing the long hash in a logical cache configured as part of a logical layer of a computer system, wherein the logical cache is configured to allow replication sessions to access the long hash stored therein. The operations include dynamically tracking when each of the corresponding replication sessions accesses the long hash stored in the logical cache and clearing the long hash from the logical cache when all of the corresponding replication sessions have accessed the stored long hash.

In certain embodiments, a computer program product includes a non-transitory computer readable storage medium having computer program code encoded thereon that when executed on a processor of a computer causes the computer to operate a storage system. The computer program product comprises computer program code for responding to a request to replicate a long hash from a production system to a plurality of target systems, wherein replication of the long hash to the plurality of target systems is associated with a corresponding replication session to each of the plurality of respective target systems, wherein the production system comprises a processor and a memory, the memory storing a plurality of long hashes, each respective long hash computed based on a corresponding data packet. The computer program product comprises computer program code for establishing a corresponding replication session for each of the plurality of target systems, for retrieving the long hash for one of the corresponding replication sessions, and for storing the long hash in a logical cache configured as part of a logical layer of a computer system, wherein the logical cache is configured to allow replication sessions to access the long hash stored therein. The computer program product comprises computer program code for dynamically tracking when each of the corresponding replication sessions accesses the long hash stored in the logical cache and for clearing the long hash from the logical cache when all of the corresponding replication sessions have accessed the stored long hash.

Details relating to these and other embodiments are described more fully herein.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 8A is a simplified diagram of a portion of an exemplary logical level cache usable with the method of FIG. 7 in at least one embodiment;

FIGS. 8B-8D are exemplary illustrations of a portion of a logical level cache resulting from the method of FIG. 7, in several illustrative embodiments;

FIG. 10A is a simplified diagram of a portion of an exemplary physical level cache usable with the method of FIG. 9 in at least one embodiment;

FIG. 10B is an exemplary illustration of a portion of a physical level cache resulting from the method of FIG. 9, in at least one illustrative embodiment; and FIG. 11 is a simplified block diagram of an apparatus that may be used to implement at least a portion of the systems and method of FIGS. 1A-10B, in accordance with at least some embodiments.

DETAILED DESCRIPTION

Figure 1A:
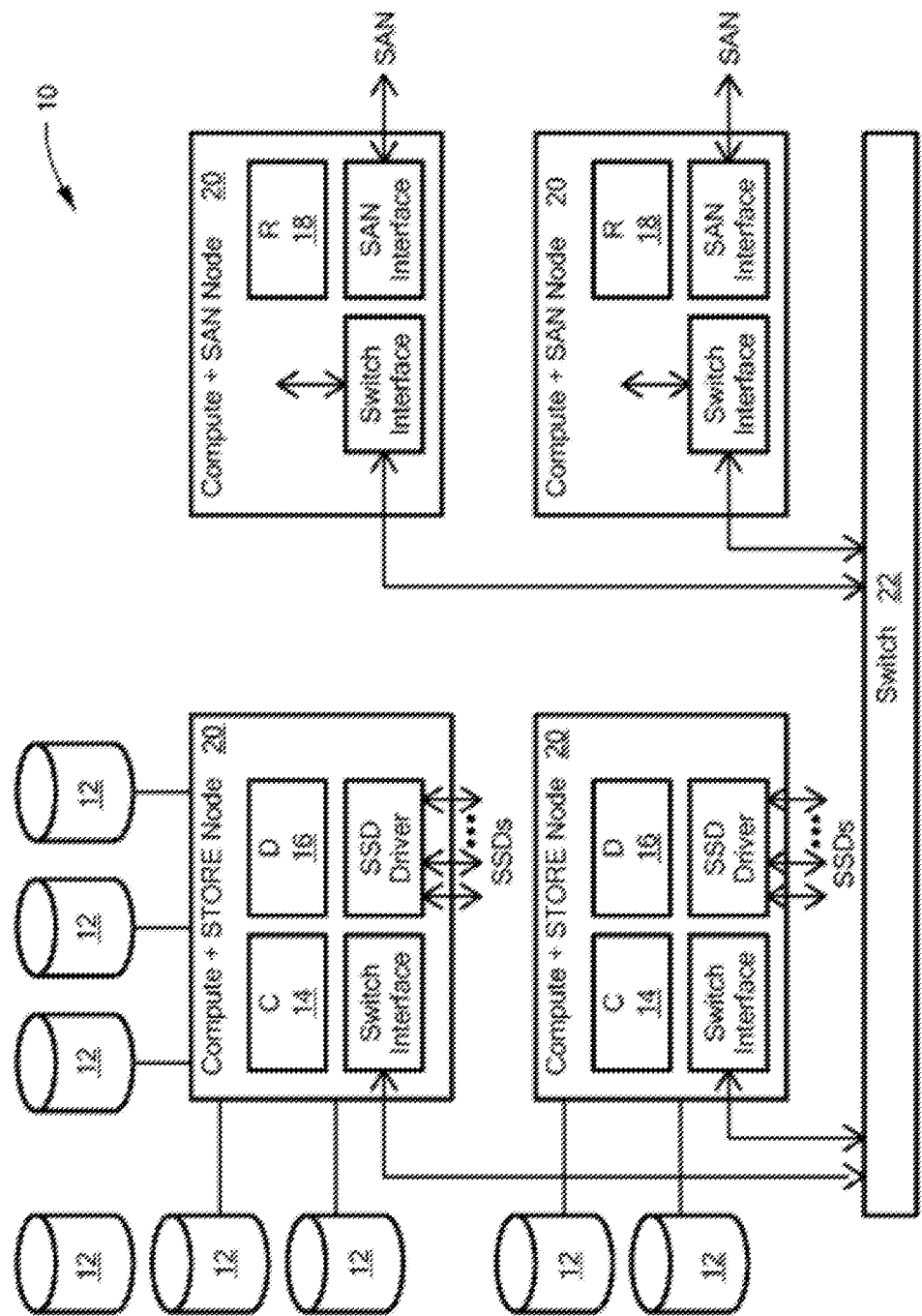
FIG. 1A is a simplified diagram schematically illustrating a distributed storage system for data storage, having separate control and data planes, in accordance with at least one illustrative embodiment of the disclosure.

Before describing embodiments of the concepts, structures, and techniques sought to be protected herein, some terms are explained, and some relevant background patents are referenced. The following description includes several terms for which the definitions are generally known in the art. However, the following glossary definitions are provided to clarify the subsequent description and may be helpful in understanding the specification and claims.

As used herein, the term "storage system" is intended to be broadly construed to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable and may also be referred to herein as a computer-readable program medium.

In certain embodiments, the term "I/O request" or simply "I/O" may be used to refer to an input or output request, such as a data read or data write request, which can originate at a host, at a user, or at any other entity in operable communication with a computer system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. LUNs can be divided into smaller logical areas, to balance the load between system modules, where each such small logical area is called a sub-LUN.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, data replication includes processes by which storage data (e.g., data stored on a data storage entity) is duplicated to a remote or local system, to help provide an enhanced level of redundancy in case a main or primary storage backup system fails. In certain embodiments, an image may be a copy of a logical storage unit at a specific point in time. In certain embodiments, a clone may be a copy or clone of the image or images, and/or drive or drives of a first location at a second location. In some embodiments, a clone may be made up of a set of objects.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period. In certain embodiments, snapshots may be taken from the original source address range as well as from previous snapshots acting as new sources. Snapshots can be arranged into a hierarchy such as a tree, in certain embodiments, with each respective snapshot considered to be a leaf of the tree. Alternately, snapshots can be arranged into a type of tree where there is a tree per snapshot. In another alternative, snapshots can be viewed as part of an array and viewed "by row" or "by column." With arrangement by row, the snapshots are arranged so that they are part of a tree of snapshots, where each leaf of the tree corresponds to another tree of addresses in that snapshot. With arrangement by column, snapshots can be arranged such that there is a tree of addresses, where each leaf contains a tree of snapshots which contain that address. In certain embodiments, a snapshot set consists of snapshots taken at the exact time on all volumes in a consistency group or, in other words, a snapshot on a consistency group.

In certain embodiments, a consistency group (CG) is a collection of base volumes in a storage array, where the base volumes that are the sources of snapshot images are referred to as member volumes of a consistency group. In certain embodiments, CGs are used to create a consistent image of a set of volumes, such as to create snapshots at both the production and the target locations. In certain embodiments, one purpose of a consistency group is to take simultaneous snapshot images of multiple volumes, thus ensuring crash-consistent (as opposed to application-consistent) copies of a collection of volumes at a particular point in time. In certain embodiments, where production volumes are written to target or copy volumes, a consistency group helps to ensure that all writes to the production volume(s) are also written to the copy(ies) in correct write-order and in consistent way, so the copy can always be used instead of production volume. For example, in some embodiments, a consistency group of data storage objects from different servers can be replicated across a network to one or more secondary servers; in the consistency group, file version objects from the different primary servers are kept consistent with each other even if applications or other user may access the original data storage object from more than one of the primary servers. In addition, the delta between successive snapshots of the consistency group can be created concurrently for data storage objects in different primary servers in such a way that the delta created at the different primary servers are consistent with each other even though an application may access the original data storage objects from more than one of the primary servers.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, a replication set may refer to an association created between a source or primary volume and a plurality of target volumes (which may be local or remote), where a consistency group may contain one or more replication sets. A consistency group can be journal protected, and in certain embodiments, all members of a consistency group can share a journal In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data. In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (Called herein, interchangeably, hash handles, short hash handles or short hashes)), for example of 6 bytes. These handles are unique to each array, but not necessarily unique across arrays. A hash signature is unique, meaning that if two hash signatures are the same then their corresponding hash blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

In certain embodiments, an X-page is a predetermined-size aligned chunk as the base unit for memory and disk operations. In certain embodiments described in the present description, the X-Page size is referred to as having 4 KB; however other smaller or larger values can be used as well, and nothing in the design is limited to a specific value.

In certain embodiments, a logical X-page address is the logical address of an X-page, containing a LUN identifier as well as the offset of the X-page within the LUN.

In certain embodiments, deduplication of data is a technique that ensures that the same data is not intentionally stored twice in different places. Advantageously, using content-based mapping of data to data modules (D-modules) and within D-modules (as described further herein in connection with FIGS. 1A-1C) provides inherent deduplication.

In certain embodiments, asynchronous replication is a technique where, after a user or other entity writes data to the primary storage array first, the asynchronous replication process commits data to be replicated to memory or a disk-based journal, including managing all the needed metadata for the replication process. It then copies the data at scheduled (e.g., periodic) intervals to replication targets. Some types of asynchronous replication can send I/O's in batches even while waiting for acknowledgement from a replication target that replication was successful. In contrast, with some types of synchronous replication, the synchronous replication process cannot continue serving I/O's until the target sends an acknowledgement for the I/O's already sent. Asynchronous replication can be advantageous for replication of data over long distances, to maintain a replica of the data at a destination site. Updates to the destination image can be issued manually, or automatically (e.g., at predetermined times) based on a customizable Recovery Point Objective (RPO) (e.g., the acceptable amount of data, measured in units of time, that may be lost in a failure).

In certain embodiments, synchronous replication is the process of copying data over a storage area network, local area network or wide area network so there are multiple, up-to-date copies of the data, where in certain embodiments, the data must be successfully stored in both local and remote sites before an acknowledgement is sent back to the host. Advantageously, synchronous replication is a replication mode in which the host initiates a write to the system at a local site. In certain embodiments, synchronous replication enables data between a source and a destination to always remain in synchronization.

Figure 6:
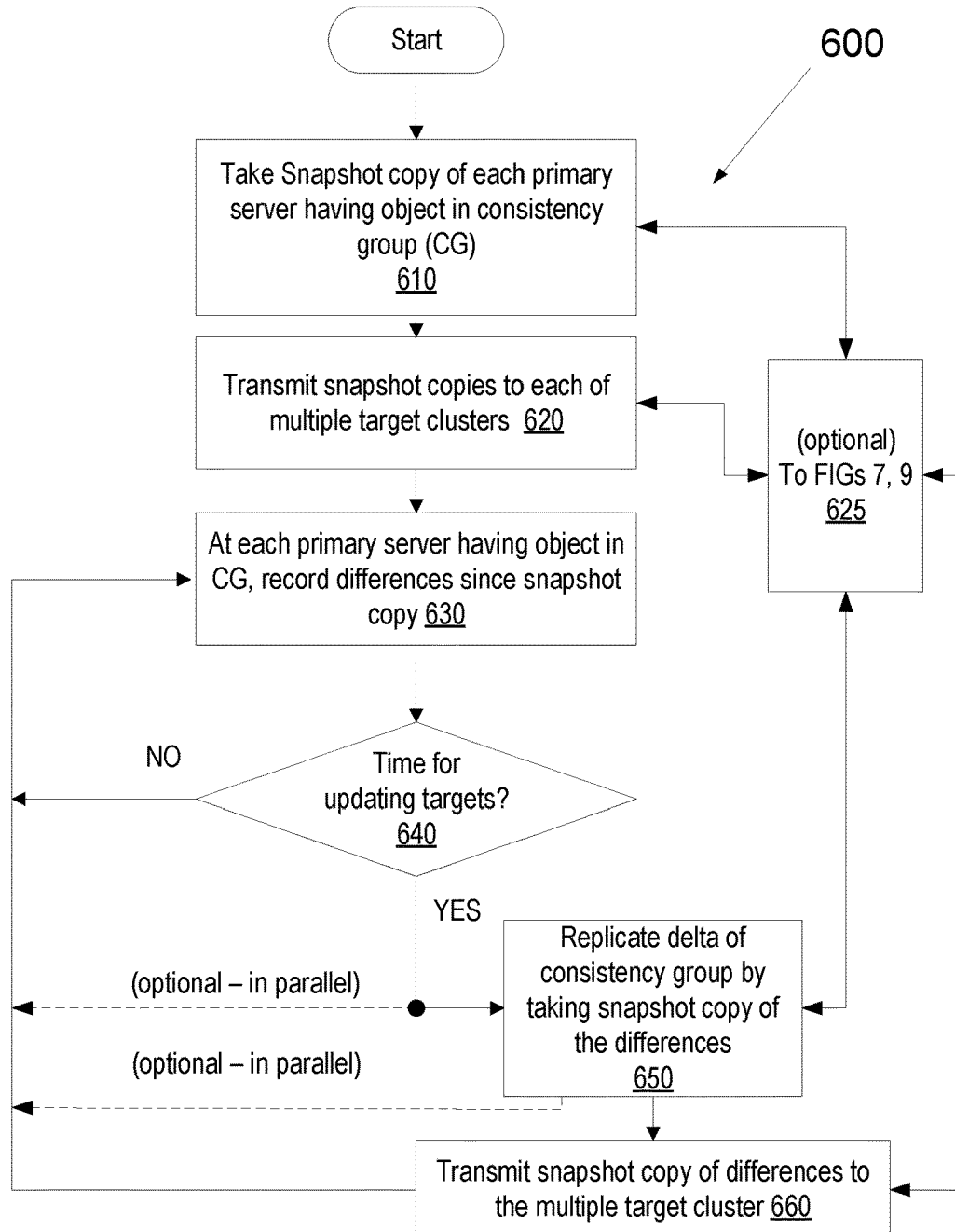
FIG. 6 is a simplified flowchart of a method of asynchronous replication, in accordance with at least one disclosed embodiment.

In certain embodiments, fan-out replication is a configuration wherein a single consistency group is replicated into multiple target clusters (i.e., in certain embodiments, has a mirror relationship with more than one target cluster), as discussed further herein in connection with FIG. 6.

In certain embodiments, a cluster is a system comprising two or more computers or systems (called nodes) which work together as a system, e.g., to execute applications or perform other tasks, so that entities that user or access them, have the impression that only a single system responds to them, thus creating an illusion of a single resource (virtual machine).

It is envisioned that at least some embodiments described herein are usable with one or more of the embodiments described in certain commonly owned U.S. patents, and background information useful in understanding one or more embodiments described herein can be found in certain commonly owned U.S. patents, including but not limited to: U.S. Pat. No. 7,765,187 ("Replication of a Consistency Group of Data Storage Objects from Servers in a Data Network"); U.S. Pat. No. 8,799,601 ("Techniques for Managing Deduplication Based on Recently Written Extents"); U.S. Pat. No. 8,990,495 ("Method and System for Storing Data in RAID Memory Devices"); U.S. Pat. No. 9,104,326 ("Scalable Block Data Storage Using Content Addressing"); U.S. Pat. No. 9,141,290 ("Snapshot Mechanism"); U.S. Pat. No. 9,208,162 ("Generating a Short Hash Handle"); U.S. Pat. No. 9,304,889 ("Suspending Data Replication"); U.S. Pat. No. 9,384,206 ("Managing Deduplication in Storage Systems"); U.S. Pat. No. 9,396,243 ("Hash-Based Replication Using Short Hash Handle and Identity Bit"); U.S. Pat. No. 9,606,870 ("Data Reduction Techniques in a Flash-Based Key/Value Cluster Storage"); and U.S. Pat. No. 9,921,963 ("Method to Decrease Computation for Cache Eviction Using Deferred Calculations"), as well as pending U.S. patent application Ser. No. 14/494,895 ("Adjusting Consistency Groups During Asynchronous Replication"); U.S. patent application Ser. No. 15/076,775 ("Storage System Asynchronous Data Replication Cycle Trigger With Empty Cycle Detection"); U.S. patent application Ser. No. 15/971,153 ("Cascading Snapshot Creation In A Native Replication 3-Site Configuration"); and U.S. patent application Ser. No. 15/970,243 ("Dual Layer Meta Data Cache For Deduplicated Storage System"). All of the above-listed patents and patent applications are hereby incorporated by reference.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment may include a plurality of "optional" features unless such features conflict.

Before describing further aspects of various embodiments herein, one or more environments in which the embodiments can be implemented, are now described.

FIG. 1A illustrates a system 10 for scalable block data storage and retrieval using content addressing, which is usable in accordance with certain embodiments described herein. The system 10 includes data storage devices 12 on which the data blocks are stored. The storage devices 12 are networked to computing modules, there being several kinds of modules, including control modules 14 and data modules 16. The modules carry out content addressing for storage and retrieval, and the network defines separate paths or planes, control paths or a control plane which goes via the control modules 14 and data paths or a data plane which goes via the data modules 16.

The control (C) modules 14 may control execution of read and write commands. The data (D) modules 16 are connected to the storage devices 20 and, under control of a respective control module, pass data to or from the storage devices. Both the C and D modules 14, 16, respectively, may retain extracts of the data stored in the storage device, and the extracts may be used for the content addressing. Typically, the extracts may be computed by cryptographic hashing of the data, as will be discussed in greater detail below, and hash modules (H) (FIG. 1B) may specifically be provided for this purpose. That is, the hash modules calculate hash values for data which is the subject of storage commands, and the hash values calculated may later be used for retrieval.

Routing modules 18 may terminate storage and retrieval operations and distribute command parts of any operations to control modules that are explicitly selected for the operation in such a way as to retain balanced usage within the system 10. The routing modules 18 may use hash values, calculated from data associated with the operations, to select the control module for the distribution. More particularly, selection of the control module may use hash values, but typically relies on the user address and not on the content (hash). The hash value is, however, typically used for selecting the Data (D) module 16, and for setting the physical location for data storage within a D module 16.

The storage devices 12 may be solid-state random-access storage devices, as opposed to spinning disk devices; however, disk devices may be used instead or in addition. A deduplication feature may be provided. The routing modules 18 and/or data modules 16 may compare the extracts or hash values of write data with hash values of already stored data, and where a match is found, simply point to the matched data and avoid rewriting. The modules are combined into nodes 20 on the network, and the nodes are connected over the network by a switch 22. The use of content addressing with multiple data modules selected based on the content hashing, and a finely grained mapping of user addresses to Control Modules, allows for a scalable distributed architecture.

Figure 1B:
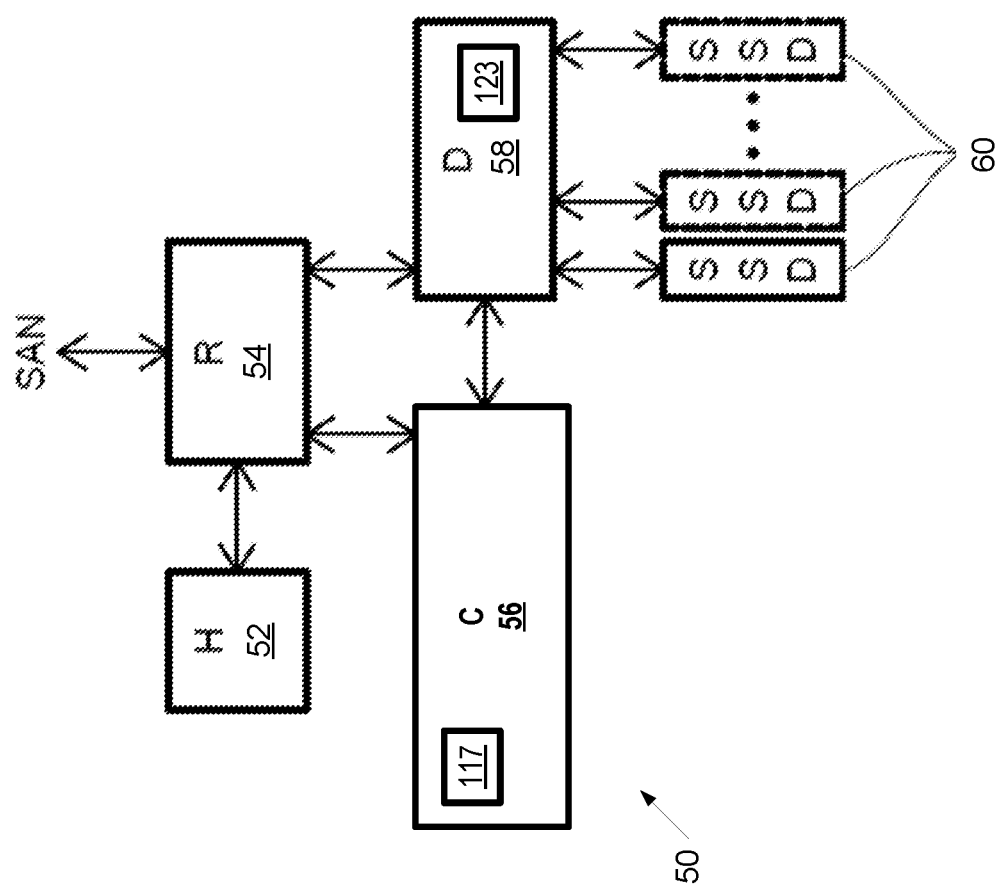
FIG. 1B is an exemplary configuration of modules for the distributed storage system of FIG. 1A, in accordance with at least one illustrative embodiment of the disclosure.

FIG. 1B is a functional block diagram of a system 50 in which a Hash (H) module 52 is connected to a routing (R) module 54. The R module 54 is connected to both Control 56 and data 58 modules. The data module 58 is connected to any number of memory devices (e.g., solid-state devices (SSD)) 60.

A function of the H module 52 is to calculate the Hash function value for a given block of data, e.g., data which is the subject of storage commands. The hash values calculated may later be used for retrieval. The Hash function may be based on standards-based hash functions such as SHA-1 and MD5, or based on a proprietary function, but this is not limiting. The hash function is selected, in certain embodiments, to generate a uniformly distributed output over the range of potential input values. In certain embodiments, H modules 52 share nodes with an R module 54, but that is not limiting. More generally, the H modules 52 can reside in certain nodes, in all nodes, together with R modules 54, or together with C modules 56 or D modules 58.

A function of the R module 54 is to terminate storage area network (SAN) Read/Write commands and route them to appropriate C and D modules 56, 58, for execution by these modules. By doing so, the R module 54 can distribute workload over multiple C and D modules 56, 58, and at the same time create complete separation of the Control and Data planes, that is, provide separate control and data paths. In certain embodiments, the R module 54 routes SCSI I/O request to the C modules 56, guarantees execution, and returns the result. In certain embodiments, the R module 54 maintains an up to date data structure called an address-to-control module (A→C or A2C) table, coordinated with the management back end (MBD), indicating which C module 56 is responsible for each logical X-page address (LXA), and also showing a balance a range of all possible LXAs between available C modules 56. In certain embodiments, for write operations, the R module 54 instructs the calculation of a hash digest for each X-page by requesting such calculation from a hash calculation module (e.g., the H module 52).

A function of the C module 56 is to control the execution of a Read/Write (R/W) command, as well as other storage functions implemented by the system. The C module 56 also may maintain and manage key metadata elements. In certain embodiments, the C module 56 receives an I/O request from an R module 54 on a certain sub-LUN (SL), guaranteeing its atomic execution (i.e., execution independent of other processes) and returns the result to the R module 54. The C module 56 also communicates with D modules 58 to execute the I/O requests. In addition, the C module 56 monitors the disk content of its logical space by associating each LXA with its hash digest; and balances the work load between the D modules for the SLs that the C module 56 is maintaining. The C module 56 and data module 58 each maintains certain data structures and corresponding metadata journals for those data structures. For example, the C module 56 maintains an "address to hash" table (A2H table, also referred to herein as A→H table) and corresponding A2H metadata journal, in the C module 56. In certain embodiments, as described further herein, the C module 56 can include a logical cache 117 (shown further in FIG. 1C). The D module 58 maintains the "hash to physical location of data" table (H2P table, also referred to herein as H→P table) and its corresponding metadata journal in the D module 58. That is, in certain embodiments, the in-memory copy of a journal is in the same module as the corresponding metadata table. In certain embodiments, the on-disk journal copy is persisted and mirrored across nodes in the cluster in journal disk chunks. In certain embodiments, the D module can include a physical cache 123 (shown further in FIG. 1C).

An A2H table (described further below in connection with FIG. 1C) maps each LXA that belongs to the SLs that the C module 56 is responsible for, to the hash digest representing the X-page Data that currently resides in that address. The C module 56 maintains an A2H table in a persistent way. The C module 56 may initiate requests to D modules 58 to save table pages to disk and read them from disk. In addition, to avoid frequent disk operations, the C module 56 maintains a journal certain of the latest table operations. These journals include (but are not limited to) the A2H metadata journals (A2H Hash tree) and dirty tree update metadata journals. As discussed below, the data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals, as discussed further herein. For example, in certain embodiments, the metadata journals include information associated with time-based changes to information in the respective A2H and H2P tables and time-based changes to the disk block allocation bitmap.

The H2P table maps each range of hash digests to the corresponding D module 58 responsible for that range. The H2P table balances the range of all possible hash digests between the available D modules 58.

A function of the D module 58 is to perform the actual R/W operation by accessing the storage devices 60 attached to it. The D module 58 may maintain metadata related with the physical location of data blocks. In certain embodiments, the D module 58 is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules 56, perform them and returning a result.

In certain embodiments, the D module 58 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 58 maintains an up-to-date H→(D, $D_{backup}$) table coordinated with the MBE, where the H→(D, $D_{backup}$) table is expected to balance the range of all possible hash digests between the available D modules 58.

Balancing between the D modules is based on hashing of the content. For example, in certain embodiments, the D module 58 makes use of a hash digest metadata table. The hash digest meta data table maps each in use hash digest, that represents actual X-Page Data, to its meta data information including its physical page on the storage media (SSD), its memory copy (if exists), a mapping to any backup memory copy and a reference count for the purpose of deduplication. The D modules 58 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 58 occurs (due to a D module 58 failure for example), the D module 58 may communicate with other D modules 58 to create new backup copies or move a primary ownership as required.

The D modules 58 allow deduplication per X-Page Data by maintaining a persistent reference count that guarantees only one copy per X-Page Data. The D modules 58 manage the hash digest metadata table in a persistent way. The table is coordinated with the physical layout for physical pages allocation, with the memory pointer, memory backup pointer, and deduplication reference count.

As will be appreciated, the R, C, D, and H modules 52-58 may be implemented in software and executed on a physical node. In addition, the aforementioned U.S. Pat. No. 9,104,326 provides information relating to additional functionality of the R, C, D, and H modules 52-58, in certain embodiments.

Figure 1C:
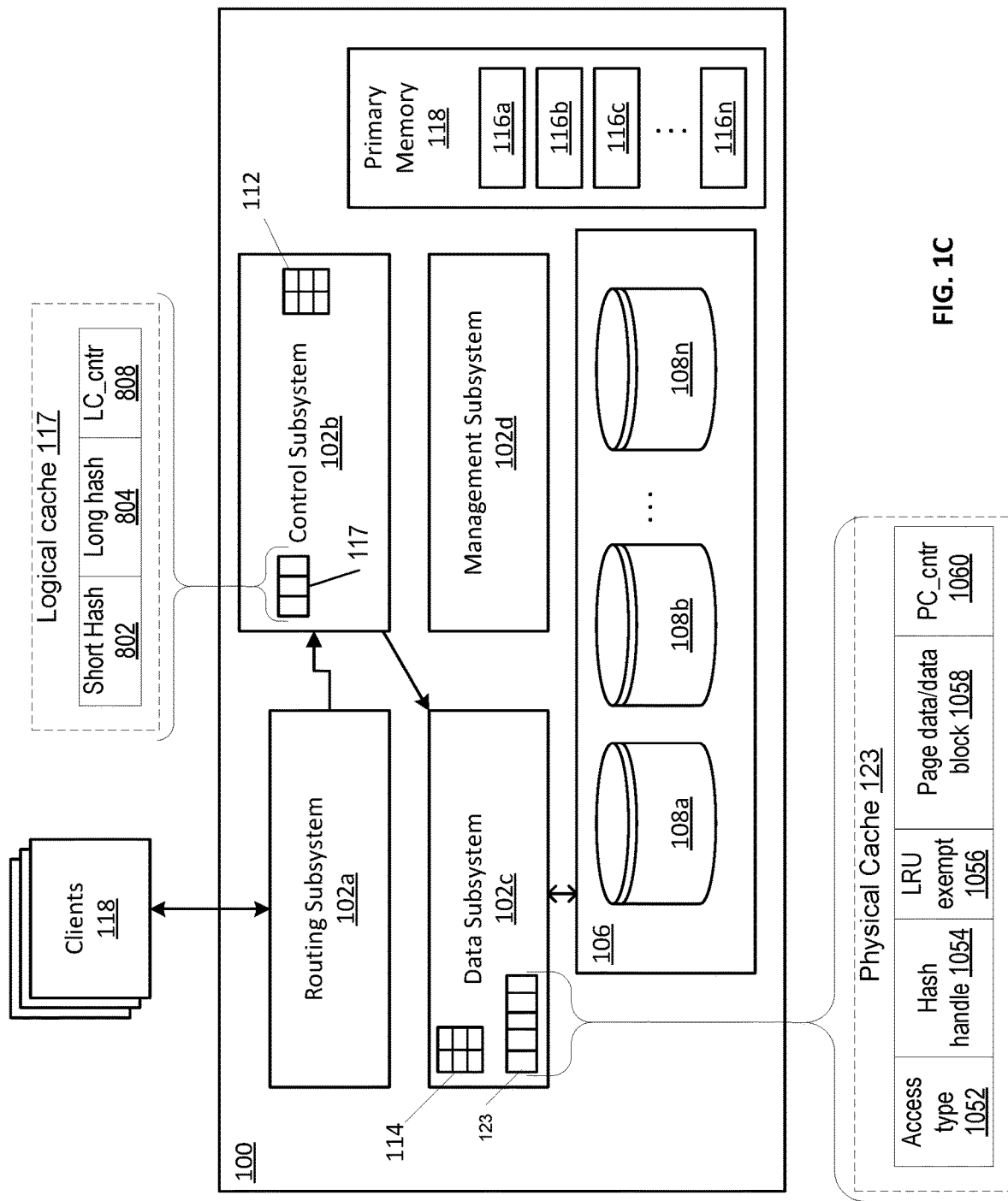
FIG. 1C is a simplified block diagram showing a portion of a storage system in accordance with at least one illustrative embodiment of the disclosure.

FIG. 1C shows a storage system 100 according to an illustrative embodiment of the disclosure. The storage system 100 may be the same as or similar to a node 20 within the distributed storage system 10 of FIG. 1A and/or the system 50 of FIG. 1B. The storage system 100 may include a plurality of subsystems 102a-102d (generally denoted 102 herein), a storage array 106 comprising a plurality of storage devices 108a . . . 108n (generally denoted 108 herein), and a primary memory 118. In some embodiments, the storage devices 108 may be provided as random-access storage devices, such as solid-state devices (SSDs).

As described further herein, the storage system 100 also can include a logical cache 117 and a physical cache 123. The logical cache 117, in certain embodiments, is part of the C module (i.e., the control subsystem 102b). The logical cache 117 and/or the physical cache 123 can, in certain embodiment, be physical devices configured to store certain data so that future requests for that data can be served faster. Advantageously, either or both of the logical cache 117 and physical cache 123 are located in a faster medium (e.g., random access memory (RAM) and/or in non-volatile memory express (NVME) or other fast memory technologies. Although the logical cache 117 and physical cache 123 are shown as being part of the storage system, that is not limiting, and the logical cache 117 and/or physical cache 123 can be located anywhere such that they are accessible quickly to the storage system. For example, in certain embodiments, either or both of the logical cache 117 and physical cache 123 could be connected as part of the system 100 via a network that is accessible by remote direct memory access (RDMA) or NVME over Fabric (also knowns as NVMEOF). Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes. Advantageously, in certain embodiments described herein, the efficiency and speed of fan-out replication systems can be improved by providing specific caches (in either or both of the logical layers and the physical layers) to store certain data used during fan-out replication. This is described further herein.

The primary memory 118 can be any type of memory having access times that are significantly faster compared to the storage devices 108. In some embodiments, primary memory 118 may be provided as dynamic random-access memory (DRAM). In certain embodiments, primary memory 118 may be provided as synchronous DRAM (SDRAM). In one embodiment, primary memory 118 may be provided as double data rate SDRAM (DDR SDRAM), such as DDR3 SDRAM.

In the embodiment shown, the subsystems 102 include a routing subsystem 102a, a control subsystem 102b, a data subsystem 102c, and a management subsystem 102d. In one embodiment, subsystems 102 may be provided as software components, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, the subsystems 102 may be provided, at least in part, as hardware, such as digital signal processor (DSP) or an application specific integrated circuit (ASIC) configured to perform functionality described herein.

The routing subsystem 102a may be configured to receive I/O operations from clients 118 using, for example, an external application-programming interface (API) and to translate client I/O operations into internal commands. In some embodiments, the routing subsystem 102a is configured to receive commands from small computer system interface (SCSI) clients 118. In certain embodiments, the system 100 may store data in fixed-size chunks, for example 4K chunks, where each chunk may have a unique hash value (referred to herein as a "chunk hash," which in certain embodiments is the same as a hash digest). In such embodiments, the routing subsystem 102a may be configured to split data into fixed-size chunks and to calculate the corresponding chunk hashes. In one embodiment, chunk hashes are calculated using Secure Hash Algorithm 1 (SHA-1)

processing. In some embodiments, a chunk corresponds to a fixed number of contiguous blocks within a storage device.

The control subsystem 102b may be configured to maintain a mapping between I/O addresses associated with data and the corresponding chunk hashes. As shown in FIG. 1C, this mapping may be maintained using a data structure 112, referred to herein as an "I/O address to chunk hash mapping table" or "A2H table," (also known as A→H table) according to some embodiments. In one embodiment, I/O addresses may be logical addresses used by clients 118 to access data within the storage system 100.

The data subsystem 102c may be configured to maintain a mapping between chunk hashes and physical storage addresses (i.e., storage locations within the storage array 106 and/or within individual storage devices 108). This mapping may be maintained using a data structure 114, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 102c may be also be configured to read and write data from/to the storage array 106 (and/or to individual storage devices 108 therein).

It will be appreciated that combinations of the A2H 112 and H2P 114 tables may provide multiple levels of indirection between the logical (or "I/O") address a client 118 uses to access data and the physical address where that data is stored. Among other advantages, this can give the storage system 100 freedom to move data within the storage array 106 without affecting a client's 118 access to that data (e.g., if a storage device 108 fails).

The management subsystem 102d may be configured to monitor and track the status of various hardware and software resources within the storage system 100. In some embodiments, the management subsystem 102d may manage the allocation of memory by other subsystems (e.g., subsystems 102a-102c) using techniques described below in conjunction with FIGS. 2-11, described further herein. In some embodiments, the management subsystem 102d can also be configured to monitor other subsystems 102 (e.g., subsystems 102a-102c) and to use this information to determine when the storage system 100 may begin processing client I/O operations after a restart.

Figure 2:
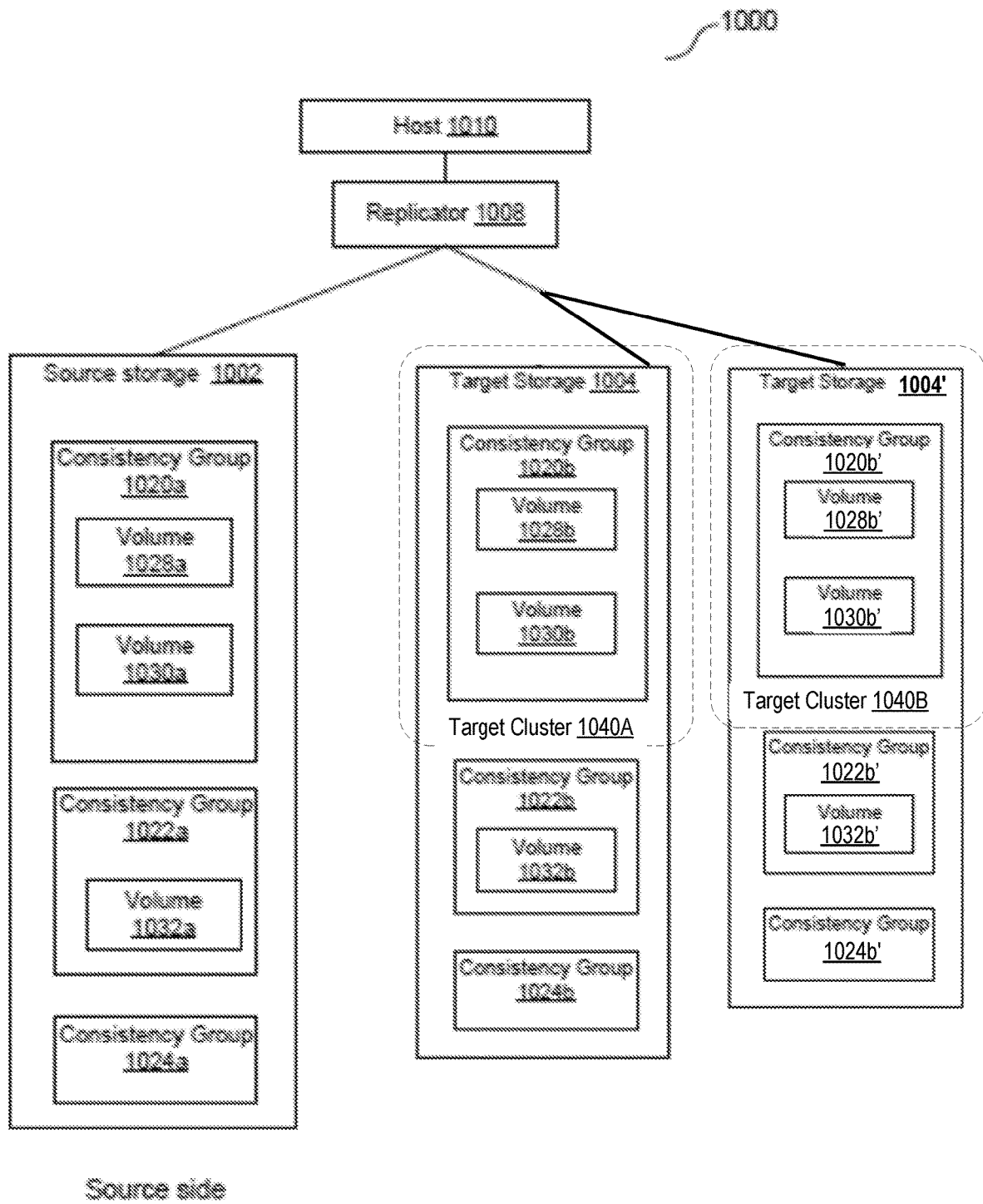
FIG. 2 is a simplified block diagram of a fan-out replication system, in accordance with one illustrative embodiment of the disclosure.

FIG. 2 is a simplified block diagram of an exemplary fan-out replication system 1000, in accordance with one illustrative embodiment of the disclosure, which may be implemented using the system 10 of FIG. 1A. The system 1000 includes a host 1010, a replicator module 1008, a source storage module 1002 (e.g., a storage array) on a source side and two or target storage modules 1004, 1004' (e.g., a storage array), on a target side, which all advantageously are in operable communication over a network (not shown). The host 1010 may include an application (not shown) that writes to the source storage 1002. The replicator module 1008 ensures that all the writes made to the source storage 1002 are also eventually made to the target storage devices 1004, 1004'. The replicator module 1008 may reside outside the storage arrays 1002 and 1004, 1004', or it may be inside one of them, or it may be in an independent system, or it may be inside the host 1010.

The source storage 1002 includes consistency groups (e.g., a consistency group 1020a, a consistency group 1022a and a consistency group 1024a) and each of the respective target storage devices 1004, 1004' also includes respective consistency groups (e.g., for each respective target 1004, 1004' a consistency group 1020b, 1020b', a consistency group 1022b, 1022b', and a consistency group 1024b, 1024b'). The consistency group 1020a includes volumes (e.g., a volume 1028a and a volume 1030a) and the consistency groups 1020b, 1020b' respectively include volumes (e.g., volumes 1028b, 1028b' and volumes 1030b, 130b', respectively). The consistency group 1022a includes a volume 1032a and the consistency groups 1022b, 1022b' includes respective volumes 1032b, 1032b'. In certain embodiments, the storage volumes 1028b, 1028b', 1030b, 1020b', 1032b, 1032b', are replicas of the respective consistency groups 1020a, 1022a on the source storage side. In certain embodiments, the target storage modules 1004 can include target clusters 1040a, 1040b.

The host 1010 also can, for example, be similar to the storage system 100 of FIG. 1C). The source storage 1002 can be located at a production site and the target storage systems 1004, 1004' can be located at a replication site. Although the system 1000 shows a plurality of consistency groups 1020, 1022, 1024 at the source side, at least some systems 1000 can have a single consistency group (e.g., consistency group 1020a) that is replicated into multiple target clusters (e.g., target cluster 1040a and target cluster 1040b). In certain embodiments, one or more of the source side consistency groups are replicated asynchronously to one or more of the target storage devices.

In certain embodiments, the consistency group 1020a and the consistency group 1020b (in each respective target cluster) may form first and second replication pairs, where the consistency group 1020a is replicated asynchronously to the consistency group 1020b. The consistency group 1022a and the consistency group 1022b (or 1022b') also form a replication pair wherein the consistency group 1022a is replicated asynchronously to the consistency group 1022b (or 1022b'). It will be appreciated that, in certain embodiments, a replication set can include, for example, three or more elements (e.g., a primary, such as consistency group 1020a, and two targets, e.g., 1020b and 1020b'.

In certain embodiments, the volumes for consistency group 1020a and the consistency group 1020b form volume pairs, so that each volume in consistency group 1020a corresponds to exactly one volume in consistency group 1020b. That is, the volume 1028a is paired with the volume 1028b and the volume 1030a is paired with the volume 1030b. In particular, in certain embodiments, the volume 1028a is replicated at the volume 1028b and the volume 1030a is replicated at the volume 1030b. In one example, a replication pair includes information on the volume pairs and the replication, and fully describes a replication instance between a source storage and a target storage.

Referring still to FIG. 2, in one example, one or more of the storage volumes on the source side and the target side are each on a respective disk. For example, in one embodiment, the storage volumes 1028a and 1030a in consistency group 1020a is on a first respective flash memory device and is configured for fan-out replication to replicate to a first target cluster 1040a and a second target cluster 1040b, which are each on respective flash memory devices. Thus, in an illustrative fan-out replication configuration, in accordance with certain embodiments herein, a single consistency group (CG) is replicated into multiple target clusters. In the asynchronous replication case, this can be done by taking snapshots, calculating differences (deltas) between snapshot generations, and rebuilding the snapshots on targets. Examples of how snapshots and deltas between snapshots are created and used in exemplary replication and storage systems are described, for example, in U.S. Pat. No. 7,764,187, which is hereby incorporated by reference. In certain embodiments, for systems such as those shown in FIG. 2, asynchronous replication is advantageous for primary storage (e.g., including a consistency group (CG)) that is replicated to targets at a greater distance. In certain embodiments, in fan-out replication, a single CG is replicated into multiple target clusters.

Figure 3:
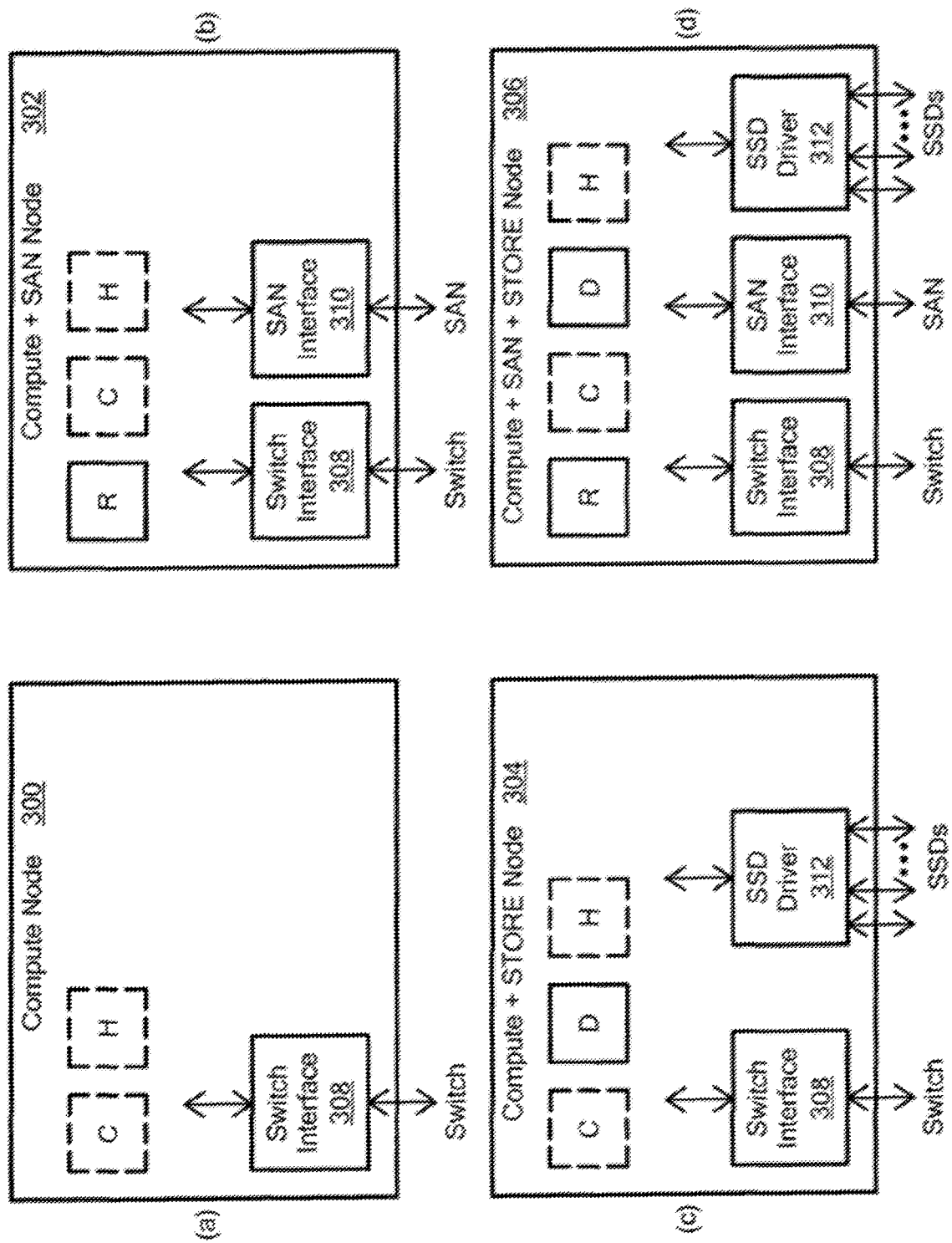
FIG. 3 is a simplified diagram schematically illustrating four different node configurations for a replication system, in accordance with one illustrative embodiment.

FIG. 3 is a simplified diagram schematically illustrating four different node configurations for a replication system usable with at least some embodiments herein, in accordance with one illustrative embodiment. In FIG. 3 each node type shows the functional Modules that execute, in at least one copy, within the Node, and functional Modules that may optionally execute within this Node. Optional Modules are shown in dashed line.

All Nodes include a switch interface 308, to allow interconnecting with a switch (see FIG. 4) in a multi-Node system configuration. A Node that contains a SAN function includes at least one SAN Interface module 310 and at least one R Module. A Node that contains a Store function includes at least one SSD Driver Module 312 and at least one D Module. Hence, in certain embodiments, Compute+SAN and Compute+SAN+STORE Nodes contain a SAN Interface, to interface with the external SAN. The interface may typically use a SCSI-based protocol miming on any of a number of interfaces including Fiber Channel, Ethernet, and others, through which Read/Write and other storage function commands are being sent to the system. Compute+Store and Compute+SAN+Store Nodes contain an SSD driver 312 to interface with SSDs 208 attached to that specific Node, where data is stored and accessed.

Figure 4:
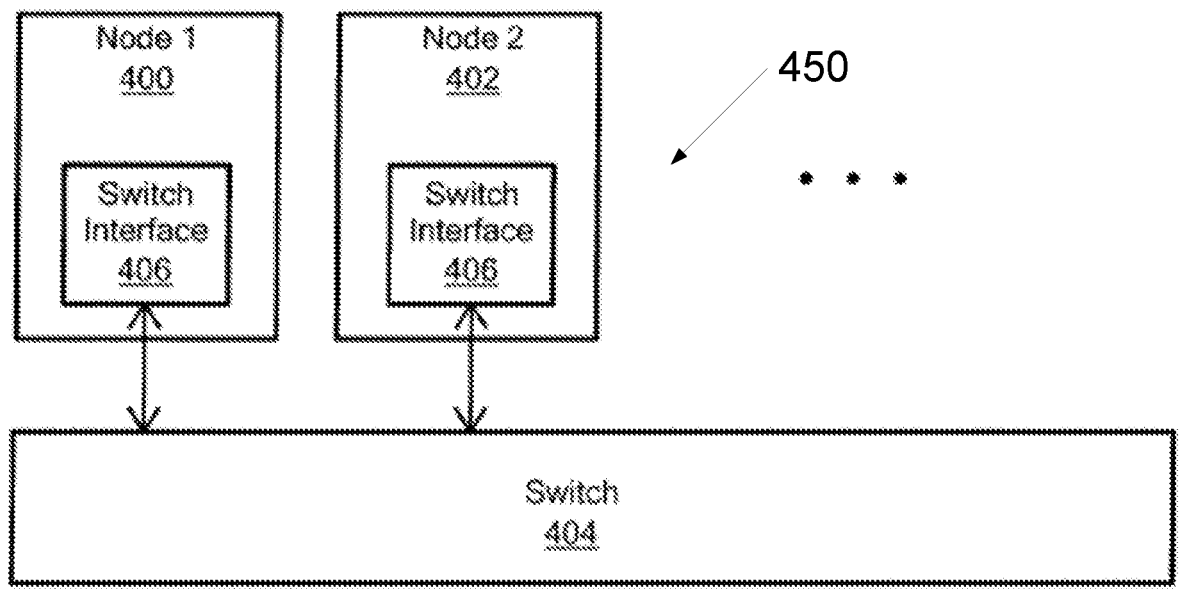
FIG. 4 is a simplified schematic diagram showing the nodes of FIG. 3 connected to a switch.

FIG. 4 is a simplified schematic diagram 450 showing the nodes of FIG. 3 connected to a switch, in a high-level system block diagram. A system implementation includes one or more Nodes 400, 402. In certain embodiments where a system contains more than two Nodes, all physical Nodes are interconnected by a switch 404 which may be based on any of a number of networking technologies including Ethernet, InfiniBand and so forth. In the specific case of a 2-Node system, the two Nodes can be interconnected directly without a need for a switch. The interconnections between each Node and the Switch may include redundancy, to achieve high system availability with no single point of failure. In such a case, each Node may contain two or more Switch Interface modules 406, and the Switch may contain two or more ports per physical Node.

Figure 5:
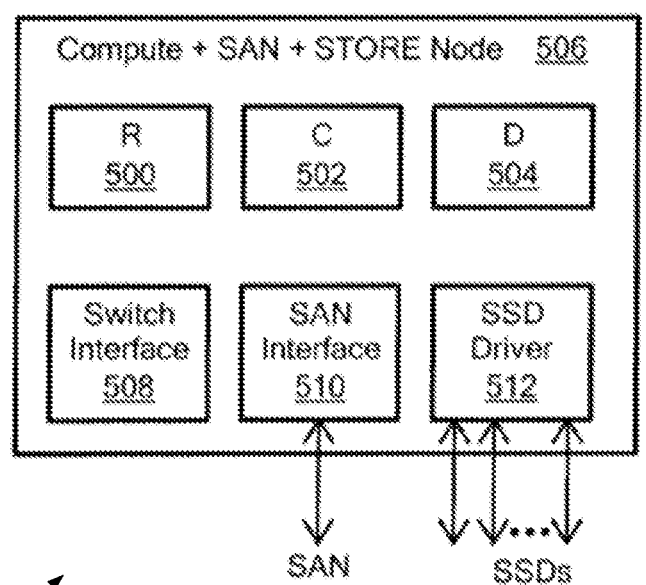
FIG. 5 is a simplified diagram showing a compute+SAN+store node for the device of FIGS. 1A-1C and 2.

FIG. 5 is a simplified diagram 550 showing a compute+SAN+store node for the device of FIGS. 1A-4. In particular, FIG. 5 illustrates a single Node system configuration, in which R, C and D modules, 500, 502 and 504 respectively are together in a compute+SAN+Store node 506. A switch interface 508 links to a switch. A SAN interface 510 provides an interface for storage area networking. An SSD driver 512 interfaces with the storage devices.

A four-node system configuration is shown in FIGS. 1A and 3 above. The configuration includes two compute and store nodes and two compute+SAN nodes. A system that is built from multiple physical Nodes can inherently support a high availability construction, where there is no single point of failure. This means that any Node or sub-Node failure can be compensated for by redundant Nodes, having a complete copy of the system's meta-data, and a complete redundant copy of stored data (or parity information allowing recovery of stored data). The distributed and flexible architecture allows for seamless support of failure conditions by simply directing actions to alternate Nodes.

The R module is responsible for routing SCSI I/O requests to the C modules, guarantee execution and return the result; and balancing the work load between the C modules for the requests it is routing. An A→C table indicates which C module is responsible for each logical X-page address (LXA). Each C module is responsible for a list of Sub LUNs (SLs). The R module receives requests for I/O's from the SAN INTERFACE routes them to the designated C modules and returns the result to the SAN INTERFACE.

If an I/O operation spans across multiple sub LUNs (SLs), and perhaps multiple C modules, then the R module has the responsibility of breaking the big I/O operation into multiple smaller independent operations according to the sub LUN unit size (SLUS). Since the atomic unit size (AUS) is never larger than the SLUS, as explained in greater detail below, each such I/O is treated as an independent operation throughout the system. The results may then be aggregated before returning to the SAN INTERFACE. The R module is responsible for maintaining an up-to-date A→C table coordinated with the MBE. The A→C table is expected to balance the range of all possible LXAs between the available C modules. For write operations, the R module instructs the calculation of the hash digest for each X-Page by requesting such calculation from a Hash calculation module.

The C module is responsible for: receiving an I/O request from an R module on a certain SL, guaranteeing its atomic execution and returning the result; communicating with D modules to execute the I/O requests; monitoring the disk content of its SLs' logical space by associating each LXA with its hash digest; and balancing the work load between the D modules for the SLs it is maintaining.

An H→D table maps each range of hash digests to the corresponding D module responsible for this range. An A→H table maps each LXA that belongs to the SLs C is responsible for, to the hash digest representing the X-Page Data that currently resides in this address. The C module receives I/O requests from R modules, distributes the work to the D modules, aggregates the results and guarantees an atomic operation. The result is returned to the R module. The C module maintains an up-to-date H→D table coordinated with the MBE. The table is expected to balance the range of all possible hash digests between the available D modules.

The C module maintains an A→H table in a persistent way. The C module may initiate I/O requests to D modules to save table pages to disk and read them from disk. To avoid frequent disk operations, a Journal of the latest table operations may be maintained. Data is balanced between the C modules based on the logical address, at the granularity of sub-LUNs.

The D module is responsible for: maintaining a set of LUNs which are attached locally and performing all I/O operations on these LUN; managing the physical layout of the attached LUNs; managing the mapping between X-Page Data hash digests and their physical location in a persistent way; managing deduplication of X-Page Data in a persistent way; and receiving disk I/O requests from C modules, perform them and returning a result. The D module is also responsible for, for each write operation, backing up the X-Page Data in the designated D backup module and performing read-modify operations for writes that are smaller than X-Page size (This process also involves computing a hash digest for these X-Pages). The D module is further responsible for maintaining an up-to-date H→(D, $D_{backup}$) table coordinated with the MBE. The H→(D, $D_{backup}$) table is expected to balance the range of all possible hash digests between the available D modules. The D module does not communicate directly with R modules. The only interaction with R modules involves RDMA read/write operations of X-Page Data. Balancing between the D modules is based on hashing of the content. The D module makes use of a hash digest metadata table. The hash digest metadata table maps each in use hash digest, that represents actual X-Page Data, to its meta data information including its physical page on the storage media (SSD), its memory copy (if exists), a mapping to any backup memory copy and a reference count for the purpose of deduplication.

A further structure used is the H→(D, $D_{backup}$) table. The H→($D_{backup}$) table maps each range of hash digests to the corresponding D module responsible for the range as well as the $D_{backup}$ module responsible for the range. The D modules allocate a physical page for each X-Page. The D modules also manage the memory for the physical storage. They allocate memory pages for read/write operations and perform background destaging from memory to storage media when necessary, for example, when running low on memory. The D modules manage a separate nonvolatile memory pool (NVRAM or UPS protected) for X-Page Data backup purposes. The backup holds X-Pages that are held in memory of the D primary and have not yet been destaged. When re-balancing between D modules occur (due to a D module failure for example), the D module may communicate with other D modules to create new backup copies or move a primary ownership as required.

The D modules allow deduplication per X-Page Data by maintaining a persistent reference count that guarantees only one copy per X-Page Data. The D modules manage the hash digest metadata table in a persistent way. The table is coordinated with the physical layout for physical pages allocation, with the memory pointer, memory backup pointer and deduplication reference count. The D modules receive I/O requests from C modules, perform the requests while supporting deduplication and return the result. The D modules may perform RDMA read/write operations on memory that resides in other modules, such as R modules as mentioned above, as part of the I/O operation. When a write operation smaller than the size of an X-Page is received, the D module may read the entire X-Page to memory and perform partial X-Page modification on that memory. In this case race conditions may occur, for example when two small writes to the same X-Page occur in parallel, and the D module may be required to compute the hash digest of the resulting X-Page. This is discussed in greater detail below.

The H-Module calculates the Hash function of a given block of data, effectively mapping an input value to a unique output value. The Hash function may be based on standards-based hash functions such as SHA-1 and MD5 or based on a proprietary function. The hash function is selected to generate a uniformly distributed output over the range of potential input values. The H modules usually share nodes with an R module but more generally, the H modules can reside in certain nodes, in all nodes, together with R modules, or together with C or D modules.

Figure 7:
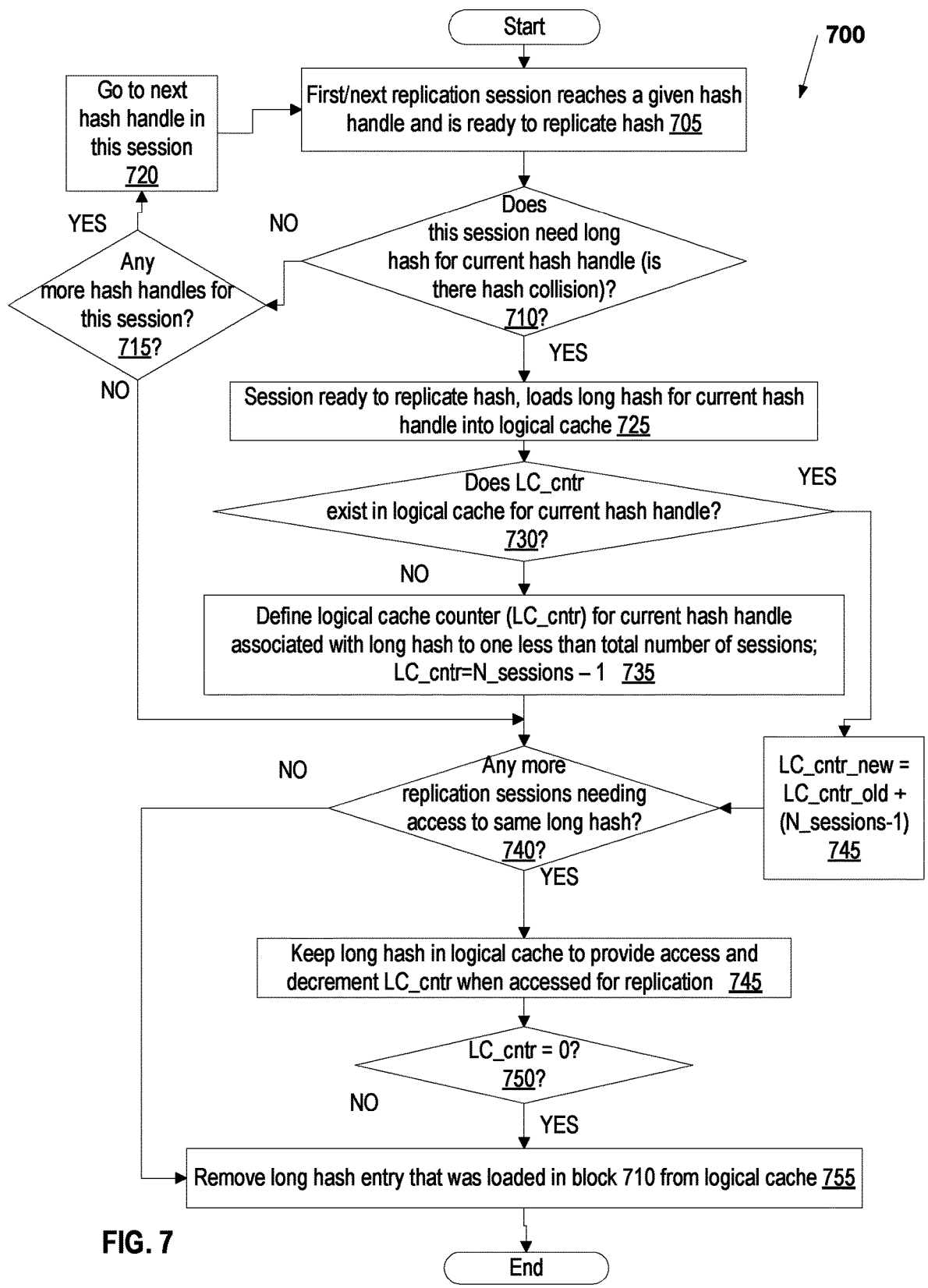
FIG. 7 is simplified flowchart of a method of fan-out asynchronous replication with logical level caching; in accordance with one embodiment.
Figure 9:
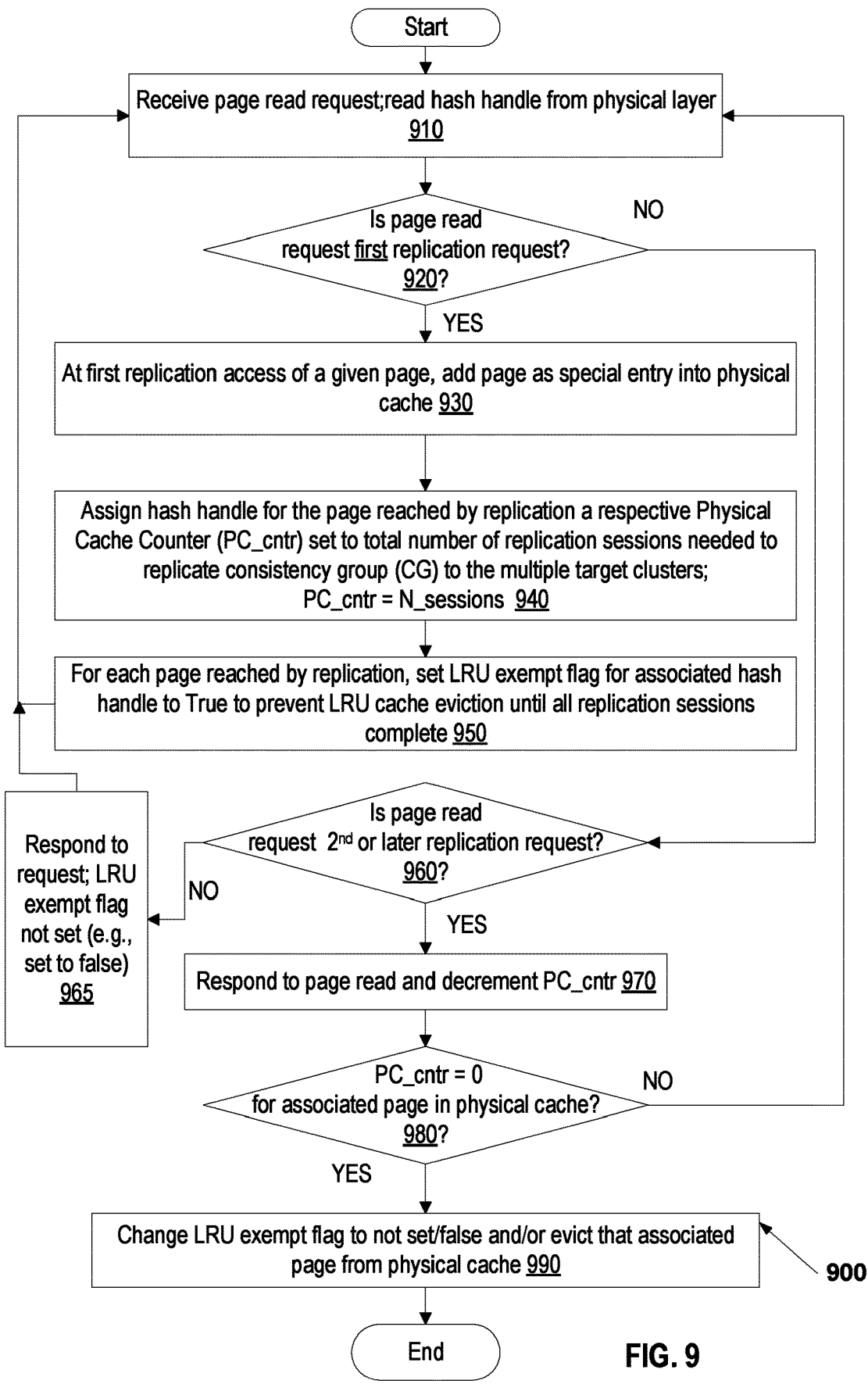
FIG. 9 is a simplified flowchart of a method of fan-out asynchronous replication with physical level caching, in accordance with one embodiment.

FIG. 6 is a simplified flowchart 600 of a method of asynchronous replication, in accordance with at least one disclosed embodiment, which method is usable, for example, with the systems of FIGS. 1C and 2 and in connection with FIGS. 7 and 9. Referring to FIGS. 1C, 2, and 6, as part of snapshot replication, a snapshot copy is made of each primary server having an object in a given consistency group (CG) (block 610); e.g., a copy is made of volumes 1028a and 1030a in CG 1020a, of FIG. 2. For example, in certain embodiments, the snapshot copy replicates a full consistency group. The snapshot copies are transmitted (e.g., using replicator 1008) to each of multiple target clusters (e.g., target clusters 1040a and 1040b of FIG. 2) (block 620). Although not shown in FIG. 6, it will be further appreciated that snapshot copies likewise could be forwarded or cascaded to other targets e.g., as shown and described in U.S. patent application Ser. No. 15/971,1537 ("Cascading Snapshot Creation In A Native Replication 3-Site Configuration"). As part of the transmission of snapshot copies and/or deltas, the techniques of FIGS. 7 and/or 9 can be used (block 625) to improve system performance.

At each primary server having an object in the CG, differences (also known as deltas) that have happened since the creation of the snapshot copy, are recorded (block 630). Asynchronous replication can occur during predetermined times or intervals, such as at predetermined periodic checkpoints. Checks are made to determine when it is time to update the targets by replicating the deltas to them (block 640). In certain embodiments, during the wait time (answer at block 640 is NO), the differences (block 630) are continually recorded. In certain embodiments, updating targets by taking a snapshot (block 650) take place every minute, but this is not limiting.

When it is time for asynchronous replication (answer at block 640 is YES), a snapshot copy is made/replicated of the differences recorded in block 630 (block 650) and this snapshot copy of the differences is transmitted to each respective fan-out target (e.g., the target clusters 660) (block 660). In certain embodiments, deltas are continually recorded and/or snapshots continue to be taken even during the actual replication in block 660; hence, the flowchart 600 shows multiple possible parallel actions if there is a YES at block 640. That is, in certain embodiments, transmission of the snapshot copy is an action that is separate from taking the snapshot and can happen at the same time. Then, so long as the asynchronous replication is running, processing loops back to block 630, so that deltas of the consistency group are periodically replicated from the primary (source) consistency groups to the one or more secondary (targets) consistency groups. As will be appreciated, in certain embodiments, the flowchart of FIG. 600 generally does not have an "end," because it is important to keep a consistent copy of the primary or other source of data at some target location so long as the source is in use, to enable failover from the target, if needed.

Referring still to FIGS. 1C, 2, and 6, in the asynchronous replication process, a first part of this asynchronous replication process, taking the snapshot copy (block 610) includes a scan process that can, in certain embodiments, further involve loading of long hashes to assist with deduplication processes that also can take place during decisions relating to transmission of the snapshot copy. The scan process, in certain embodiments, scans the snapshot to calculate the delta; when the delta is transmitted, the process will use metadata and data stored in the cache(s), as described further herein (hence the paths to block 625 in flowchart 600). For example, in certain embodiments, transmitting snapshot copies to each of multiple target clusters (block 620) may involve repeatedly sending the same long hash to each fan-out target. As is understood, one known way to attempt to accomplish fan-out replication is to replicate synchronously to all the replication sessions associated with the target system. One disadvantage of this synchronous replication approach, however, is that the replicating synchronously will be as slow as the slowest target system (e.g., a target cluster), because synchronous replication often requires that data must be successfully stored in both local and remote sites before an acknowledgement is sent back to the host. Thus, a slow acknowledgement from one or more targets can mean that completion of synchronous sending of the delta can become delayed. Note that synchronous sending of the delta is not quite the same as synchronous replication, because with synchronous replication, user I/O is paused until it is sent to a target. In contrast, with synchronous sending of the delta, all deltas are sent to all targets asynchronously, but the process does not proceed to the next address in the delta until all targets have acknowledged receipt of the delta. It is advantageous if a replication system can be configured with one or more features that can at least partially mitigate bottleneck effects causes by slower systems, slower replication cycles, and other issues that can cause replication delays.

In addition, another issue that can occur with some implementations of synchronous replication is that it might not be possible to accomplish the replicating synchronously if the cycle length is different for different replication sessions. In at least one embodiment described further herein, an implementation is presented that allows for more efficiently performing the scan and loading of long hashes, e.g., during fan-out asynchronous replication, even when the replication cycles are completely independent, using logical and/or physical caching, as described herein. In certain embodiments, the long hash is loaded into a logical cache (e.g., logical cache 117 or FIG. 1C) during the replication cycle and is configured so that it can be re-used for each associated fan-out replication. A further advantage of not having to repeat loading of the long hash with each replication session, in accordance with at least some embodiments described herein, is that, instead of having to read the long hash from the disk every time the process needs it, instead the process can read the long hash from memory, which is much faster.

In certain replication embodiments, there are two basic types of messages sent from a primary to a target: messages containing a short hash (also referred to herein as a "hash handle" or "short hash handle" or "short hash") and a long hash, both of which were described previously herein. The short hash (which is, e.g., 6 bytes in certain embodiments, but this is not limiting) is generally unique within a cluster but not necessarily within an entire replication system. Thus, as will be appreciated, when a target system receives a short hash and identifies it as "familiar," or identical to a given short hash that it has access to, it is not necessarily clear whether a first short hash necessarily refers to the same data as a second short hash. When two identical short hashes are similar or identical, but relate to different data, it can result in a hash collision.

In a second type of message, a long hash (e.g., around 20 bytes in certain embodiments) is sent. In certain embodiments, the operation of reading this long hash is somewhat "expensive" (in time and/or system resource) because it often is necessary to access the disk to send the long hash to the target. As is understood, a long hash is substantially unique between systems; generally, for a given piece of data, there is only one long hash. As will be understood, because the long hash is 20 bytes long, the probability of different data having similar long hashes (e.g., the probability of hash collisions) is extremely low.

One issue with short hashes, as noted above, is the probability of a collision (e.g., that there is an identical hash). For example, the probability of a collision on a 6-byte hash is approximately one in $2^{48}$; in comparison, the probability of collision with a 20-byte hash is approximately one in $2^{160}$. This, the probability of a collision for a long hash is extremely low. It certain embodiments, it can be known that a short hash (also known herein as a short hash handle) is unique within a cluster. In addition, there are known techniques, such as those described in aforementioned U.S. Pat. No. 9,396,243 (which is hereby incorporated by reference) to help further ensure that a short hash is unique, such as by slightly modifying the short hash with appended data, to differentiate the short hashes.

In one embodiment, as discussed further below in connection with at least FIGS. 1C, 2, and 7, as part of fan-out asynchronous replication logical level caching, an implementation is provided that adds, in the logical layer, an additional cache 117 (FIGS. 1B, 1C) of previously loaded long hashes. For example, in one embodiment, an entry consists of a short to long hash mapping and a running number of sessions that haven't accessed this hash handle (e.g., as shown and discussed further below in connection with FIGS. 7 and 8A-8B).

FIG. 7 is simplified flowchart 700 of a method of fan-out asynchronous replication with logical level caching; in accordance with one embodiment. FIG. 8A is a simplified diagram 800 of a portion of an exemplary logical level cache usable with the method of FIG. 7 in at least one embodiment. FIG. 8A shows (and also as the logical cache 117 of FIG. 2 shows), in one illustrative embodiment, an additional cache of previously loaded long hashes, in the form of logical cache 117 (shown as diagram 800 in FIG. 8A). The exemplary logical cache 800 of FIG. 8A can be configured to include a mapping 806 between a short hash 802 and a corresponding long hash 804 as well as a logical cache counter (LC_CNTR) 808, where the LC_CNTR counter 808 is configured to track a running number of consistency group replication sessions (i.e., N_Sessions) that have not yet accessed the short hash 802 (also referred to herein as hash handle). FIGS. 8B-8D illustrate exemplary illustrations of a portion of a logical level cache resulting from the method of FIG. 7, in several illustrative embodiments, explained further below. The method of FIG. 7 shows a sequence of actions happening for the first access of a single long hash, during a first replication session, from the first time the long hash is needed to the point that the long hash is no longer needed, as well as actions that can take place with other hash handles, during the same replication session.

Referring to FIGS. 1C, 2, 7, and 8A-8D, when a first session is ready to replicate a long hash from a source to each of a plurality of targets, the plurality of replication sessions to each of the respective targets take place substantially simultaneously, but in certain embodiments, one replication session could be faster than the others. In certain embodiments, the "fastest" replication session is the first one that reaches a given hash handle is ready to replicate the hash and to receive the long hash (block 705), if needed. In certain embodiments, a session may not need a long hash, such as in situations where there is no hash collision (recall that, a long hash can be determined, in certain embodiments, based on the short hash/hash handle, assuming that it is known that there is no hash collision and that the short hash/hash handle is unique at a given target. Thus, referring to FIG. 7, a check is made (block 710) to see if the replication session needs the long hash (i.e., has there been hash collision). If there has not been hash collision for a given hash handle, it may not be necessary to put the long hash into a logical cache, since asynchronous replication will not necessarily be made more efficient than simply having the target compute the long hash later, based on what is known to be a unique short hash (since no collision). up by loading in In certain embodiments, there can be more than one way to address the issue if not all sessions need this long hash. For example, consider a configuration such as the arrangement of FIG. 2, where the consistency group 1020*a* is being replicated to consistency group 1020*b* in target cluster 1040A also is replicated to consistency group 1020*b'* in target cluster 1040B. Suppose that, in a replication session that has reached target cluster 1040A, an exemplary hash "890" results in a collision, but in a replication session that has reached target cluster 1040B, this same hash handle "890" does not result in a collision. This type of situation is illustrated in the tables of FIGS. 8B and 8C, which are illustrative tables depicting the type of information that can be stored in data structures, where these tables compare how the same set of hash handles are treated in two different replication sessions, each replicating to a different target. As FIG. 8A shows, all of the short hashes that are part of that replication session depicted in FIG. 8A, have collisions, so a corresponding long hash is needed. In contrast, in FIG. 8B, two of the hashes ("890" and "345") did not have hash collisions, so it is not necessary to have or provide in this replication session, from the source or target side, the corresponding long hashes.

In certain embodiments, there can be different ways to deal with the issue of not all replication sessions needing the long hash (e.g., not all replication sessions having hash collisions). In some embodiments, the logical cache 117 (FIG. 1B, 1C) can be configured to contain all short hashes (hash handles) having a respective counter (explained further below), and the entry for a corresponding long hash is populated only if necessary (e.g., if there is a collision), where the long hashes are removed when the counter reaches zero (indicating that no more replication sessions need quick access to the particular long hash). One advantage of this approach is that it helps to minimize the information needed to be added to a hash handle entry, e.g., adding only 1 byte (for a counter) to a 6-byte hash handle difference that is being saved anyway, as part of the replication.

In certain embodiments, yet another way to deal with an issue of not all replication sessions needing the long hash is to implement a configuration where long hashes are stored in the logical cache 117 only for one replication cycle (replication session) only and are not saved in cache for other replication cycles; instead, the logical cache 117 is flushed out once the replication session is completed (so all the entries that have non-zero values when cycle ends are thrown out).

Referring again to FIGS. 1C, 2, 7, and 8A-8D, when a first session (e.g., the fastest session) is ready to replicate a long hash from a source to each of a plurality of targets (block 705), a check is made to determine if the replication session needs the long hash for the current hash handle being replicated (block 710). Effectively, in certain embodiments, this is checking for a hash collision. If the answer at block 710 is "NO," then the session does not need a long hash for the current hash handle being replicated, so, a check is made to determine whether there are additional hash handles to be replicated in this replication session (block 715). If the answer at block 715 is "Yes", processing returns to get the next hash handle for the replication session (block 720).

If the answer at block 710 is "YES", the long hash to be replicated is loaded into a logical cache 117 (assuming there is space in the logical cache), where the logical cache 117 can be configured as part of a logical layer (block 725). As will be appreciated, in certain embodiments, if there is no space in the logical cache, then the optimizations described herein, in connection with the logical cache, cannot take place until sufficient space exists. In certain embodiments, the first consistency group replication session that is ready to replicate the long hash from the source to the target is considered to be the "fastest" replication session and is the only one that must load the needed metadata into the logical cache. The other consistency group replication sessions for that same long hash, can make use of the information the first session has loaded into the logical cache. For example, in certain embodiments, every replication from a given consistency group to its corresponding target storage necessarily will be replicating the same set of hashes for that group, and the "fastest" replication session is the only one that needs to load the needed metadata associated with the hash, into the logical cache. Because the metadata for a given hash will remain useful until the last session reaches it, the metadata for the hash can stay in its designated logical cache location until replication to the "slowest" target storage is complete, as described below.

Referring again to FIG. 7, a check is made (block 730) to determine if the counter exists (the counter tracking whether all replication sessions that need to access the long hash, have accessed it). In certain embodiments, the counter LC_CNTR 808 (see FIGS. 8A-8C) is set to one less than the number of replication sessions, because it is assumed that the first replication session, which led to its creation, does not have to happen again. In certain embodiments, the LC_CTNR 808 could already exist because when there is a deduplicated piece of data, the logical layer will have the same hash handle in different locations (addresses), such that a previous replication session could have already created an LC_CNTR 808 for that hash handle. As will be understood, in certain embodiments, a replication session could end up reaching the same hash handle multiple times for different addresses. In certain embodiments, when this occurs, a new entry is created with an LC-CNTR 808 set to N_Sessions−1 (one less than the total number of replications sessions). If N_Sessions−1 is non-zero, the long hash is copied into the logical cache 117. If N_Sessions−1 is zero, the LC_CNTR is set to a value that arises from adding the value of N_Sessions−1 to the counter. This is explained further below.

Referring again to block 730 of FIG. 7, if the LC_CNTR 808 does not already exist (answer at block 730 is "NO"), a logical cache counter, LC_CNTR 808 is defined for the current hash handle associated with the long hash (block 735). The LC_CNTR 808 is set to a number that is one less than the total number of consistency groups (CG) to which a given source is to be replicated, which is one less than the number of replication sessions needed to replicate the primary to all fan-out targets (e.g., to N_Sessions−1). If the LC_CNTR 808 already exists in the logical cache (e.g., due to deduplication, as noted above), the LC_CNTR 808 (which typically will be at zero at the end of any prior action) is increased to N_Sessions−1 (block 740).

For example, for the system of FIG. 2, assume that the consistency group 1020*a* on the source storage 1002 is to be replicated to both target cluster 1040*a* and target cluster 1040*b*, as part of fan-out replication, so in this system the total number of times the consistency group (CG) is to be replicated (e.g., total number of sessions), after the first replication, is N_Sessions−1=2−1=1. This example is not, of course, limiting, as in various embodiments, a consistency group may need to be replicated to more than two target clusters, as will be appreciated.

Once the long hash 804 is loaded, and the LC_CNTR 808 is set, replication session needing access to the already-loaded hash (answer at block 740 is YES) will decrease the LC_CNTR 808 (block 745), where the long hash is kept in the logical cache 177 to provide quick access during replication. When the LC_CNTR 808 reaches zero (block 750), the entry for the particular hash associated with that LC_CNTR 808 can be removed from the logical cache 117 (block 755).

FIG. 8B is an exemplary and simplified illustration 850 of a portion of a logical level cache usable with the method of FIG. 7, at an instant in time, for a hypothetical replication system having 5 target systems to which a single consistency group is to be replicated, and 5 different hash mapping pairs of both a short hash 802 and its corresponding long hash 804 and LC_CNTR 808, in the logical cache. As noted above, in this hypothetical example, it is assumed that all short hashes/hash handles have collisions and thus the corresponding long hash 804b is required for each short hash/hash handle, but these examples are not limiting. Long hashes are not needed for each replication session, only if it is suspected that the long hash is needed for a given target. In sessions where a hash handle is already on the target, is not necessary to load it into the cache. In FIG. 8B, each entry shows a long hash that has been accessed at least once, with LC_cntr 808 being the number of remaining sessions. In the hypothetical example of FIG. 8B, the long hash generally needed for each replication session, because in this example, each long hash is on the target being accessed during the replication session, because of issues with hash collisions with the short hashes. However, as noted above, in other examples, if a particular replication session does not indicate that a short hash collision (also known as hash handle collision) is going to take place (or has taken place) for given target, then it is not necessary to cache the corresponding long hash 804—replicating only the short hash 802 will be sufficient, because the short hash handle can be used to derive the long hash Thus, as FIG. 8B illustrates, the long hash 1634 is at its first access for replication, so the LC_CNTR is set to N_CG−1=5−1=4. FIG. 8B also illustrates that long hash 3456 (shown in BOLD) has an LC_CNTR 806 that has just hit zero, at this instant in time, and thus can be removed from the logical cache 117.

FIG. 8C, as noted above, shows that for short hashes "890" and "345", the corresponding long hash is not needed to be put into the cache. FIG. 8D shows that, at a certain address (address 0300), the short hash of "234" is the same as the short hash at address 100; thus, the corresponding long hash at address 300 can be copied from address 100, assuming that the replication session accesses addresses sequentially such that address 100 comes first.

Referring again to FIG. 7, in certain embodiments, when it is determined that a given hash handle is no longer needed (i.e., its count LC_cntr 808 dropped to zero) it is possible to do "pruning" of the older cache entries, even the other entries are not at zero. This can happen, in rare situations, if the method reaches a hash handle in all the sessions per cycle. In this situation, everything that is older was reached during the replication session, if the order of replication is the same within a given replication session.

In the embodiments of FIGS. 7-8D, one of the problems that this configuration helps to solve is a situation where replication to one of the fan-out targets where that target accomplishes its respective replication faster than at least some of the other fan-out targets, such that slower targets start having a larger and larger gap as compared to the faster fan-out targets, potentially never catching up and creating system bottlenecks. By being able to take advantage of the "work" the fastest target does in loading the long hash to a logical cache where the other targets can use it, a replication system can perform asynchronous fan-out replication more quickly and can become more efficient, especially as compared to configurations where the long hash is not already loaded. In addition, by the end of the replication session where the slower targets have been able to catch up to the faster ones by making use of long hashes stored in the logical cache, most of the targets will end up with a convergence of speed for the replication sessions, such that even the replications sessions to the slowest targets will have less work catching up.

Another aspect of the second part of the asynchronous replication process described above is the scan process and the loading of pages (e.g., the data that goes with the long hash) that is needed when the remote side (e.g., the target for fan-out replication) does not have the long hash (or the data associated with the long hash), where it is desirable to both have the pages available for quick access while needed for fan-out replication, and then to remove the pages from quick access locations (e.g., a cache) when no longer needed. That is, if a target already has the data that goes with a long hash (i.e., the data from which the long hash was derived), the target will recognize the long hash and will not need the data. If, however, the target does not have the data that goes with a long hash, the target will not recognize the long hash and thus will request data, then register the data's long hash.

One known way to accomplish the scanning and loading of pages/data that goes with a long hash is to use a regular least recently used (LRU) based cache for the replication where previous accesses are checked, and entries are removed from the LRU cache based on that checking. One disadvantage of the LRU approach is that it is possible to remove entries from cache too early (if, for example, the process did not have cache hits quick enough for the other sessions). Another disadvantage of the LRU approach is that removing entries from a cache often will happen too late; that is, with the LRU approach a page will stay in the cache for some time after the last replication session finishes with it.

Having unneeded entries in a cache too long can slow down system performance, as is well understood. For a cache to be effective at reducing system latency, including latency of performing a process such as fan-out replication, the cache advantageously should contain the hottest (i.e., most relevant) data and should hold that data only as long as it is needed, then the data should be removed (also called evicted) to make room for new data. But merely relying on recency data (LRU data), as is used with conventional LRU caching, may not be sufficient to optimize latency in some situations, such as with fan-out replication. In certain embodiments, data needs to stay in the cache until all fan-out targets have accessed it, which may or may not be the same as the most recent use of the data (e.g., per conventional LRU eviction policies). For example, other uses of the data (e.g., user accesses) may be occurring at substantially the same times as fan-out replication. In certain embodiments, these user accesses can help to keep data "hot" and in the cache and off the list of data that has not been recently accessed. In certain embodiments, however, the user accesses are not being "counted" towards LRU when the LRU is being specifically monitored for fan-out replication related accesses. For example, fan-out replication may be "done" with data, but users may still be accessing it, which could count towards LRU. However, users may not require the fast access that a cache provides, so in that situation, it would be advantageous to be able to remove the data from the cache (and let the users get data from memory), so that the cache can be available to help speed processes like fan-out replication. In addition, one concern is when user I/O's can cause entries needed for replication to be removed from the cache and replaced by the data and/or metadata associated with the user I/O (i.e., so-called "cache trashing" of information specifically stored in the cache for reasons other than user I/O.

Thus, in at least one embodiment described further herein, an implementation is presented that provides a physical cache (e.g., such as the physical cache 123 of FIG. 1C) configured to store pages required for fan-out replication, where the physical cache is further configured to allow for removing cache entries sooner, for example as soon as it is known that a fan-out replication session is done with the information associated with the cache entry. In certain embodiments, this removal occurs even when the replication cycles (e.g., the replication cycles for fan-out targets and for replicating pages to those targets) are completely independent of each other and/or are independent of other accesses to the same data (such as the user accesses described above). In particular, in certain embodiments, with a method described for at least one embodiment herein, (described further below), the pages being replicated will stay in the physical cache for the minimal necessary time and are deleted once the final fan-out replication session access is complete. Physical level caching, as described herein also can be used to improve replication performance and lower the number of resources that the application is taking away from the system.

In certain embodiments described below, in place of the use of LRU techniques for the physical cache, a type of "time to live" counter for a page of data is established, where the time to live counter is set based on knowing, at the time the counter is set (e.g., in advance, or at least at the time of replication) how many total accesses to the page of data will be needed (e.g., by knowing how many replication sessions need to take place based on how many fan out targets exist). In certain embodiments, once a replication session or cycle completes, the logical cache 117 is automatically emptied and/or its entries are invalidated. In certain embodiments, if the number of fan-out target systems are known, it will therefore be known how many more accesses are needed (corresponding to the number of replication sessions remaining for a given consistency group to be replicated to all targets), where for each access, the counter is decremented, until no more accesses are known to be need (no more replication sessions in the fan out replication). At that point, the data can be removed from the physical cache.

FIG. 9 is a simplified flowchart 900 of a method of fan-out asynchronous replication with physical level caching, in accordance with one embodiment. FIG. 10A is a simplified diagram 1050 of a portion of an exemplary physical level cache (e.g., similar to physical cache 123 of FIG. 1C) that is usable with the method of FIG. 9 in at least one embodiment. FIG. 10B is an exemplary illustration of a portion of a data structure for a physical level cache resulting from the method of FIG. 9, in at least one illustrative embodiment.

As FIGS. 10A and 10B show, in certain embodiments, the physical cache diagram 1050 includes certain fields that are set up for each entry in the physical cache, including access type 1052, hash handle 1054, an LRU exempt flag 1056, the corresponding page data/data block 1058, and a physical cache counter (PC_CNTR) 1060. The access type 1052 is, in certain embodiments, optional, and is used to help differentiate whether the access to a cached page in the physical cache is for replication ("Replication"), in which case it will be counted as one of the page reads that is being counted down, or whether the page access is for a purpose other than replication ("Non-Replication"), such as access by a user or other entity. The hash handle 1054 is computed in a similar way to the hash handles as described above for the logical cache, but the hash handle 1054 here is a different value, because the hash handle of FIGS. 9-10B is based on page data 1058. As shown in FIG. 10B, when the hash handle 1054 is read, it can include a special bit marking the hash handle as "first," which is shown for illustrative purposes in FIG. 10B as an added "F" to the hash handle (this is not limiting, and those of skill in the art will appreciate that the first read of a given hash handle can be indicated or designated in many different ways).

Referring still to FIG. 9-10B the "LRU exempt" marker 1056 is set to True or False (i.e., not set) to indicate whether the hash handle is subject to LRU aging (LRU exempt marker set to False or not set) or whether the hash handle should not be part of the regular cache and should not be removed until all replication sessions are done (LRU exempt marker 1056 set to True). The page data/data block 1058 contains the information/data for the page. The PC CNTR 1060 is the counter of replication accesses remaining, which generally will correspond to the number of replication sessions that are remaining (e.g., a replication session per target to which a consistency group is being replicated.)

The method of FIG. 9 shows actions happening for a page read into the physical cache, from first page read of a given page, to eviction from the cache. These actions would take place individually for each page read. Referring to FIGS. 9-10B, when a page read request is received (block 910), it is checked to determine if it is a first replication request for that page (block 920). For example, if the data structures of FIGS. 10A-10B are used, a check could be made to see if the hash handle 1054 includes the "F" bit. This is because in certain embodiments, for each page reached by replication for a first time, when the hash handle is reached by the fastest session, the hash handle is read from the physical layer with a special bit marking "first".

If the answer at block 920 is YES (a first access), then the page reached the first time by replication is added as a special entry in the physical cache 123 (block 930). The hash handle for the page reached by replication is assigned a PC_CNTR 1060 set to the total number of replication sessions needed to replicate a given consistency group to the multiple target clusters during fan-out replication (e.g., PC_CNTR=N_Sessions (block 940).

In addition, when the page is read to the physical cache, it is marked by a special flag indicating that the page should not be removed (not subject to the LRU aging that normally would be applicable to the physical cache) (block 950). The special flag, in the example of FIGS. 9-10B, is called an LRU exempt flag 1056, but this is not limiting, and those of skill in the art will appreciate that many different arrangements can be used to indicate that a given page should not be removed. When the LRU exempt flag 1056 is set to "True," it will, to prevent cache eviction of the page until all replication sessions are complete. As shown in FIG. 9, a replication that is marked as a "first" access does not decrement the PC CNTR counter 1060 but instead causes the PC CNTR counter 1060 to be set to N_Session. However, subsequent replication accesses to the same page (e.g., page read requests that are $2^{nd}$ or later replication requests)

will not be "first" accesses and thus will cause the PC_CNTR counter 1060 to decrement, as described below.

As noted above, for each page reached by replication, a flag is set (e.g., the LRU exempt flag 1056) for the associated hash handle to prevent cache eviction of the page (that is, to prevent the page from being removed as part of LRU aging processes for the physical cache 123) until all replication sessions associated with that hash handle are complete (e.g., as evidenced by the PC_CNTR counter going to zero (answer at block 980 is YES). Every subsequent access to the a given page, for replication, yields a physical cache hit that decrements the PC_CNTR counter 1060 (block 970).

At block 920, if the answer is NO (i.e., the page read is not a first replication request), a check is made to determine if the page read request is a $2^{nd}$ or later replication request (block 960). If the answer is NO at block 970, then the request is a replication request and thus is not "counted" against the PC_CNTR 1060 that is tracking the number of replication sessions that access the hash handle. Thus, if the answer is NO at block 970, as FIG. 9 shows, the non-replication request is responded to (block 965), and the LRU exempt flag 1056 will not be set to True (i.e., it will be not set or set to False), and the processing returns to wait for additional page read requests (block 910).

If the next page read is a replication request (i.e., answer at block 960 is YES), since it is not a first replication request, then the page read is responded to and the PC_CNTR 1060 is decremented by one count (block 970). The page read request is treated as a cache hit, because every subsequent access to the physical layer cache 123, after the first access, is treated as a cache hit.

After the PC_CNTR 1060 is decremented (block 970) a check is made to see if the PC_CNTR 1060 for the given page is at zero (block 980). If the answer is NO at block 980, then the system can wait for more read requests and processing returns to block 910. If the answer at block 980 is YES, then it is the last replication session, and the page can be marked for immediate removal (e.g., evicted from the physical cache) (block 990).

In certain embodiments, there can be other ways of checking for user accesses to a page other than by setting an access type flag 1052, as will be appreciated. In some embodiments, for example, non-replication accesses (e.g., user accesses) could still cause the PC_cntr to decrement, and that might decrease efficiency and speed somewhat by requiring the page to be reloaded an additional time. In some embodiments, the implementations described herein provide improvements with speed and performance in a manner that considers that in a typical system, replication is not running in a void (i.e., as the only action happening), but is running in an environment with other user IO's, and possibly other replication sessions, as well.

FIG. 10B shows a diagram 1070, for a time sequence from time $T_0$ through time $T_9$, what happens with three different pages that have been stored in the physical cache 123 during fan-out replication, in accordance with one exemplary embodiment. The diagram 1070 is for an example where there are 5 targets that a single consistency group must replicate to during fan-out replication and depicts the physical cache 123 during a time subset for three page reads. At time $T_0$, the hash handle "234" is accessed for the first time, so it includes the F bit, the access type 1052 is set to "Replication" and the LRU exempt marker 1056 is set to "True". Because at this time it is known that there are 5 total targets to be replicated to, and this is the first request, it is known that there need to be 4 replication accesses remaining, so the PC_CNTR 1060 is set to 4. As FIG. 10B shows in BOLD, the hash handle "234" is accessed again at $T_1$, $T_3$, $T_5$, and $T_7$, for replication accesses associated with replicating a consistency group to each of its 5 targets. $T_7$ was the last access, so the entry of "234" (and its associated page of "99887766554433") can be removed from the physical cache, substantially immediately. For example, once the PC_cntr 1060 reaches zero, the LRU exempt bit 1056 setting could change from True to False, allowing the LRU aging to apply. Or, in certain embodiments, the physical cache could be immediately evicted, which could be faster than waiting for LRU aging.

FIG. 10B also shows that at time $T_2$, there was a non-replication access to hash handle 234 that required access to the corresponding page. As can be seen, the PC_cntr 1060 was not decremented as a result of that access, because it was not a replication access needed to replicate the consistency group to one of the targets, and the LRU exempt flag 1056 was set to False. FIG. 10B also shows that at times $T_6$ and $T_9$, other hash handles were accessed, and at time $T_8$ there was another non-replication access to one of the other hash handles.

As the method of FIG. 9 shows, embodiments that implement this method can provide advantages over known techniques, such as using the fact that the exact number of accesses to the physical cache entry can be known, in comparison to a regular LRU cache where the system attempts to infer whether the data is needed by checking previous accesses and/or how recently an access occurred.

In certain embodiments, either or both of physical caching and logical caching can be implemented to improve latency, efficiency, and/or performance of a given system, but it should be understood that none of the implementations described herein are dependent. In particular, the implementation shown in the method of FIG. 7 is not dependent on the implementation shown in the method of FIG. 9. In various embodiments, the methods of FIGS. 7 and 9 also can be used together. In certain embodiments, the physical cache 123 and/or the logical cache 117 can be cleaned out or emptied for other reasons than those shown in FIGS. 7 and 9, including but not limited to conditions such as (a) error during replication; (b) error at source end; (c) error at one or more target ends; (d) replication session has ended and there is leftover information in the logical cache 117 and/or physical cache 123; (e) in response to a specific command or instruction to do so, such as one initiated by a user or other entity, or resulting from the outcome of another process, etc.; and (g) when one or more replication cycles are stopped.

It will also be appreciated that the implementations discussed herein are not limited to fan-out replication configurations but are applicable to any replication configuration where the number of replication sessions is known in advance.

In the above-described flow charts of FIGS. 6, 7, and 9, rectangular elements, herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Further, the processes and operations described herein can be performed by a computer especially configured for the desired purpose or by a general-purpose computer especially configured for the desired purpose by another computer program stored in a computer readable storage medium or in memory.

FIG. 11 is a simplified block diagram of an apparatus that may be used to implement at least a portion of the systems and method of FIGS. 1A-10B, in accordance with at least some embodiments. As shown in FIG. 11, computer 1100 may include processor 1102, volatile memory 1104 (e.g., RAM), non-volatile memory 1106 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 1110 (e.g., a touchscreen, a display, and so forth) and input and/or output (I/O) device 1108 (e.g., a mouse, a keyboard, etc.). Non-volatile memory 1104 stores, e.g., journal data 1104a, metadata 1104b, and pre-allocated memory regions 1104c. The non-volatile memory, 1106 can include, in some embodiments, an operating system 1114, and computer instructions 1112, and data 1116. In certain embodiments, the computer instructions 1112 are configured to provide several subsystems, including a routing subsystem 1112A, a control subsystem 1112b, a data subsystem 1112c, and a write cache 1112d. In certain embodiments, the computer instructions 1112 are executed by the processor/CPU 1102 out of volatile memory 1104 to perform at least a portion of the processes shown in FIGS. 2-8. Program code also may be applied to data entered using an input device or GUI 1110 or received from I/O device 1108.

The systems and processes of FIGS. 1A-10B are not limited to use with the hardware and software described and illustrated herein and may find applicability in any computing or processing environment and with any type of machine or set of machines that may be capable of running a computer program. The processes described herein may be implemented in hardware, software, or a combination of the two. The logic for carrying out the method may be embodied as part of the system described in FIG. 11, which is useful for carrying out a method described with reference to embodiments shown in, for example, FIGS. 1A-10B. The processes and systems described herein are not limited to the specific embodiments described. For example, the processes of FIGS. 6, 7, and 9 are not limited to the specific processing order shown. Rather, any of the blocks of the processes may be re-ordered, combined, or removed, performed in parallel or in serial, as necessary, to achieve the results set forth herein.

Processor 1102 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital, or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general-purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid-state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a micro-controller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

For example, when the program code is loaded into and executed by a machine, such as the computer of FIG. 11, the machine becomes an apparatus for practicing the invention. When implemented on one or more general-purpose processors, the program code combines with such a processor to provide a unique apparatus that operates analogously to specific logic circuits. As such a general-purpose digital machine can be transformed into a special purpose digital machine. FIG. 11 shows Program Logic 1124 embodied on a computer-readable medium 1120 as shown, and wherein the Logic is encoded in computer-executable code configured for carrying out the reservation service process of this invention and thereby forming a Computer Program Product 1122. The logic may be the same logic on memory loaded on processor. The program logic may also be embodied in software modules, as modules, or as hardware modules. A processor may be a virtual processor or a physical processor. Logic may be distributed across several processors or virtual processors to execute the logic.

In some embodiments, a storage medium may be a physical or logical device. In some embodiments, a storage medium may consist of physical or logical devices. In some embodiments, a storage medium may be mapped across multiple physical and/or logical devices. In some embodiments, storage medium may exist in a virtualized environment. In some embodiments, a processor may be a virtual or physical embodiment. In some embodiments, a logic may be executed across one or more physical or virtual processors.

For purposes of illustrating the present embodiment, the disclosed embodiments are described as embodied in a specific configuration and using special logical arrangements, but one skilled in the art will appreciate that the device is not limited to the specific configuration but rather only by the claims included with this specification. In addition, it is expected that during the life of a patent maturing from this application, many relevant technologies will be developed, and the scopes of the corresponding terms are intended to include all such new technologies a priori.

The terms "comprises," "comprising", "includes", "including", "having" and their conjugates at least mean "including but not limited to". As used herein, the singular form "a," "an" and "the" includes plural references unless the context clearly dictates otherwise. Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A computer-implemented method, comprising:
    responding to a request to replicate one or more pages of data from a production system to a plurality of target systems, wherein the replication of the pages of data to the plurality of target systems is associated with a corresponding replication session to each of the plurality of respective target systems, wherein the production system comprises a processor having access to a memory and to a physical cache, wherein the physical cache is configured for storing a plurality of pages of data needed for the replication of the one or more pages of data to the plurality of target systems, each respective page of data having a respective hash signature computed based on the respective page of data and a respective hash handle that is used to access the respective hash signature;
    determining, for each of the one or more pages, a total number of corresponding replications needed to replicate the respective page of data to the plurality of target systems;
    establishing the corresponding replication session for each of the plurality of target systems;
    receiving a request for the respective page of data based on a first hash handle;
    determining a type of the received request, wherein the type indicates whether the request is for one of a replication session and a non-replication session;
    if it is the first time the first hash handle has been requested, then:
        retrieving the respective page of data associated with the first hash handle;
        storing the respective page of data in the physical cache;
        dynamically tracking when each of the corresponding replication sessions requests the respective page of data based on the first hash handle, to determine when the total number of corresponding replications has taken place, wherein, as part of the dynamic tracking, request types corresponding to non-replication sessions are not counted towards the total number of corresponding replications;
    if it is not the first time the first hash handle has been requested then:
        retrieving the respective page of data from the physical cache; and
        based on the dynamic tracking, clearing the respective page of data from the physical cache when all of the corresponding replication sessions have requested the respective page of data based on the first hash handle; and
        clearing the respective page of data from the physical cache when a determination is made that at least one of the following conditions exists: all of the corresponding replication sessions that require the respective page of data in the physical cache, have accessed the respective page in the physical cache and the total number of corresponding replications has been reached;
    wherein at least one of the determination of the type of received request, the dynamic tracking of the requests for the respective page of data and the clearing of the respective page of data from the physical cache, is configured so that the processor requires only one physical cache to respond to the request to replicate the one or more pages of data from the production system to the plurality of target systems.

2. The method of claim 1, wherein the corresponding replication sessions are configured to begin at substantially the same time.

3. The method of claim 1, wherein retrieving the respective page of data further comprises retrieving the respective page of data for the one of the corresponding replication sessions that is the first of the corresponding replication sessions that is ready to receive the respective page of data.

4. The method of claim 1, wherein dynamically tracking further comprises:
    setting a counter to track when each corresponding replication session has requested the respective page of data, the counter having a counter value;
    changing the counter value upon each subsequent replication session accessing the respective page of data stored in the physical cache; and
    clearing the respective page of data from the physical cache when the counter value indicates that all replication sessions have accessed the respective page of data.

5. The method of claim 1, wherein the plurality of target systems correspond to a predetermined number of target systems and the predetermined number is the same as the total number of corresponding replications.

6. The method of claim 1, wherein the physical cache is configured to perform the dynamic tracking.

7. The method of claim 1, wherein the physical cache is configured to dynamically track at least one of: the type of the received request and the total number of replications.

8. A computer program product including a non-transitory computer readable storage medium having computer program code encoded thereon that when executed on a processor of a computer causes the computer to operate a storage system, the computer program product comprising:
 computer program code for responding to a request to replicate one or more pages of data from a production system to a plurality of target systems, wherein the replication of the pages of data to the plurality of target systems is associated with a corresponding replication session to each of the plurality of respective target systems, wherein the production system comprises a processor having access to a memory and to a physical cache, wherein the physical cache is configured for storing a plurality of pages of data needed for the replication of the one or more pages of data to the plurality of target systems, each respective page of data having a respective hash signature computed based on the respective page of data and a respective hash handle that is used to access the respective hash signature;
 computer program code for determining, for each of the one or more pages, a total number of corresponding replications needed to replicate the respective page of data to the plurality of target systems;
 computer program code for establishing the corresponding replication session for each of the plurality of target systems;
 computer program code for receiving a request for the respective page of data based on a first hash handle;
 computer program code for determining a type of the received request, wherein the type indicates whether the request is for one of a replication session and a non-replication session;
 computer program code for determining if it is the first time the first hash handle has been requested, and if it is the first time the given hash handle has been requested then:
  computer program code for retrieving the respective page of data associated with the first hash handle;
  computer program code for storing the respective page of data in a physical cache;
  computer program code for dynamically tracking when each of the corresponding replication sessions requests the respective page of data based on the first hash handle, to determine when the total number of corresponding replications has taken place, wherein, as part of the dynamic tracking, request types corresponding to non-replication sessions are not counted towards the total number of corresponding replications;
 computer program code for determining if it is not the first time the first hash handle has been requested, and if it is not the first time the first hash handle has been requested, then:
  computer program code for retrieving the respective page of data from the physical cache; and
  computer program code for clearing the respective page of data from the physical cache when all of the corresponding replication sessions have requested the respective page of data based on the first hash handle, based on the dynamic tracking; and
  computer program code for clearing the respective page of data from the physical cache when a determination is made that at least one of the following conditions exists: all of the corresponding replication sessions that require the respective page of data in the physical cache, have accessed the respective page in the physical cache and the total number of corresponding replications has been reached;
 wherein at least one of the determination of the type of received request, the dynamic tracking of the requests for the respective page of data and the clearing of the respective page of data from the physical cache, is configured so that the processor requires only one physical cache to respond to the request to replicate the one or more pages of data from the production system to the plurality of target systems.

9. The computer program product of claim 8, further comprising computer program code for retrieving the respective page of data for the one of the corresponding replication sessions that is the first of the corresponding replication sessions that is ready to receive the respective page of data.

10. The computer program product of claim 8, further comprising:
 computer program code for setting a counter to track when each corresponding replication session has requested the respective page of data, the counter having a counter value;
 computer program code for changing the counter value upon each subsequent replication session accessing the respective page of data stored in the physical cache; and
 computer program code for clearing the respective page of data from the physical cache when the counter value indicates that all replication sessions have accessed the respective page of data.

11. The computer program product of claim 10 wherein the plurality of target systems correspond to a predetermined number of target systems and the predetermined number is the same as the total number of corresponding replications.

12. The computer program product of claim 8 further comprising computer program code to configure the physical cache to perform the dynamic tracking.

13. The computer program product of claim 8, further comprising computer program code for configuring the physical cache to dynamically track at least one of: the type of the received request and the total number of replications.

14. A system, comprising;
 a processor; and
 a non-volatile first memory in operable communication with the processor and storing computer program code that when executed on the processor causes the processor to execute a process operable to perform the operations of:
 responding to a request to replicate one or more pages of data from a production system to a plurality of target systems, wherein the replication of the pages of data to the plurality of target systems is associated with a corresponding replication session to each of the plurality of respective target systems, wherein the production system comprises a processor having access to a second memory and to a physical cache, wherein the physical cache is configured for storing a plurality of pages of data needed for the replication of the one or more pages of data to the plurality of target systems, each respective page of data having a respective hash signature computed based on the respective page of data and a respective hash handle that is used to access the respective hash signature;

determining, for each of the one or more pages, a total number of corresponding replications needed to replicate the respective page of data to the plurality of target systems;

establishing the corresponding replication session for each of the plurality of target systems;

receiving a request for the respective page of data based on a first hash handle;

determining a type of the received request, wherein the type indicates whether the request is for one of a replication session and a non-replication session;

if it is the first time the first hash handle has been requested, then:
   retrieving the respective page of data associated with the first hash handle;
   storing the respective page of data in a physical cache;
   dynamically tracking when each of the corresponding replication sessions requests the respective page of data based on the first hash handle, to determine when the total number of corresponding replications has taken place, wherein, as part of the dynamic tracking, request types corresponding to non-replication sessions are not counted towards the total number of corresponding replications;

if it is not the first time the first hash handle has been requested then:
   retrieving the respective page of data from the physical cache; and
   based on the dynamic tracking, clearing the respective page of data from the physical cache when all of the corresponding replication sessions have requested the respective page of data based on the first hash handle; and clearing the respective page of data from the physical cache when a determination is made that at least one of the following conditions exists: all of the corresponding replication sessions that require the respective page of data in the physical cache, have accessed the respective page in the physical cache and the total number of corresponding replications has been reached;

wherein at least one of the determination of the type of received request, the dynamic tracking of the requests for the respective page of data and the clearing of the respective page of data from the physical cache, is configured so that the processor requires only one physical cache to respond to the request to replicate the one or more pages of data from the production system to the plurality of target systems.

15. The system of claim 14, wherein the corresponding replication sessions are configured to begin at substantially the same time.

16. The system of claim 14, wherein retrieving the respective page of data further comprises retrieving the respective page of data for the one of the corresponding replication sessions that is the first of the corresponding replication sessions that is ready to receive the respective page of data.

17. The system of claim 14, wherein dynamically tracking further comprises computer program code that when executed on the processor causes the process to execute a process operable to perform the operations of:
   setting a counter to track when each corresponding replication session has requested the respective page of data, the counter having a counter value;
   changing the counter value upon each subsequent replication session accessing the respective page of data stored in the physical cache; and
   clearing the respective page of data from the physical cache when the counter value indicates that all replication sessions have accessed the respective page of data.

18. The system of claim 14, wherein the plurality of target systems correspond to a predetermined number of target systems and the predetermined number is the same as the total number of corresponding replications.

19. The system of claim 14, wherein the physical cache is configured to perform the dynamic tracking.

20. The system of claim 14, wherein the physical cache is configured to dynamically track at least one of: the type of the received request and the total number of replications.

\* \* \* \* \*